(12) United States Patent
Iisaka et al.

(10) Patent No.: US 7,812,481 B2
(45) Date of Patent: Oct. 12, 2010

(54) POWER TRANSMISSION CONTROL DEVICE, POWER TRANSMISSION DEVICE, ELECTRONIC INSTRUMENT, AND NON-CONTACT POWER TRANSMISSION SYSTEM

(75) Inventors: Ken Iisaka, Chino (JP); Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 280 days.

(21) Appl. No.: 12/163,300

(22) Filed: Jun. 27, 2008

(65) Prior Publication Data
US 2009/0026844 A1 Jan. 29, 2009

(30) Foreign Application Priority Data

Jun. 29, 2007 (JP) ............................. 2007-171346
Jul. 13, 2007 (JP) ............................. 2007-184270

(51) Int. Cl.
*H01F 27/42* (2006.01)
*H01F 37/00* (2006.01)
*H01F 38/00* (2006.01)

(52) U.S. Cl. ..................................... 307/104; 320/108
(58) Field of Classification Search ................ 307/104, 307/106; 320/108
See application file for complete search history.

(56) References Cited

U.S. PATENT DOCUMENTS

| 6,028,413 | A | * | 2/2000 | Brockmann | ................ | 320/108 |
| 7,605,496 | B2 | * | 10/2009 | Stevens et al. | ................ | 307/17 |
| 2009/0009006 | A1 | | 1/2009 | Jin et al. | | |

FOREIGN PATENT DOCUMENTS

| JP | A-05-300662 | 11/1993 |
| JP | A-09-103037 | 4/1997 |
| JP | A-10-260209 | 9/1998 |
| JP | A-11-341711 | 12/1999 |
| JP | A-2000-295796 | 10/2000 |
| JP | A-2003-250233 | 9/2003 |
| JP | A-2005-210800 | 8/2005 |
| JP | A-2006-060909 | 3/2006 |
| JP | A-2006-230129 | 8/2006 |

OTHER PUBLICATIONS

U.S. Appl. No. 12/163,266, filed Jun. 27, 2008, in the name of Ken Iisaka et al.
U.S. Appl. No. 12/167,812, filed Jul. 3, 2008, in the name of Mikimoto Jin et al.

* cited by examiner

*Primary Examiner*—Jared J Fureman
*Assistant Examiner*—Carlos Amaya
(74) *Attorney, Agent, or Firm*—Oliff & Berridge, PLC

(57) ABSTRACT

A power transmission control device provided in a power transmission device of a non-contact power transmission system includes a drive clock signal generation circuit that generates a drive clock signal specifying a drive frequency of a primary coil, a driver control circuit that generates a driver control signal based on the drive clock signal, and outputs the driver control signal to a transmission driver, a waveform detection circuit that detects a change in waveform of an induced voltage signal of the primary coil, and a control circuit that performs foreign object detection based on a detection result of the waveform detection circuit. The drive clock signal generation circuit outputs the drive clock signal set at a foreign object detection frequency during foreign object detection, the foreign object detection frequency being a frequency differing from a normal power transmission frequency.

16 Claims, 18 Drawing Sheets

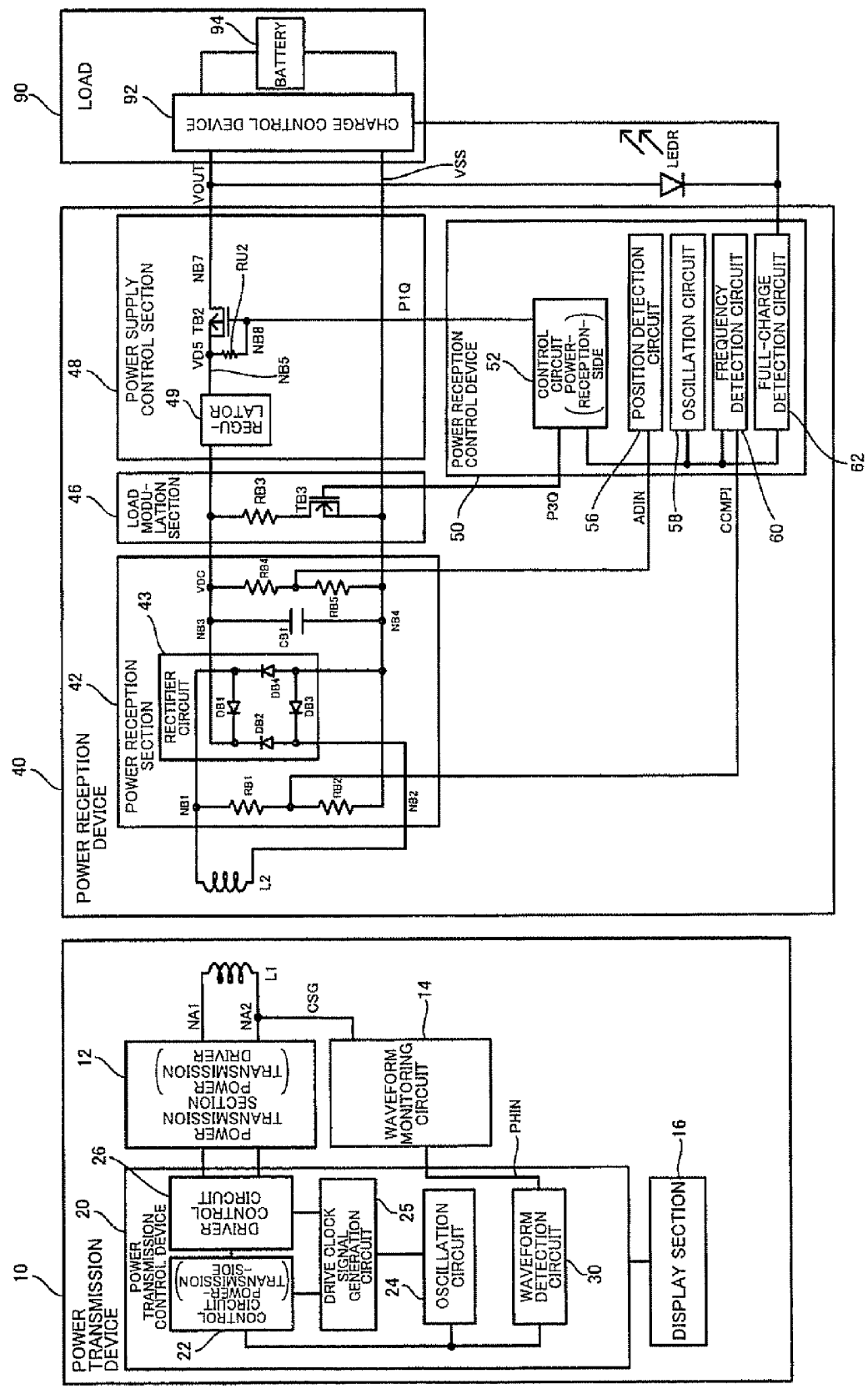

LOW LOAD

HIGH LOAD

FIG. 8A LOW LOAD
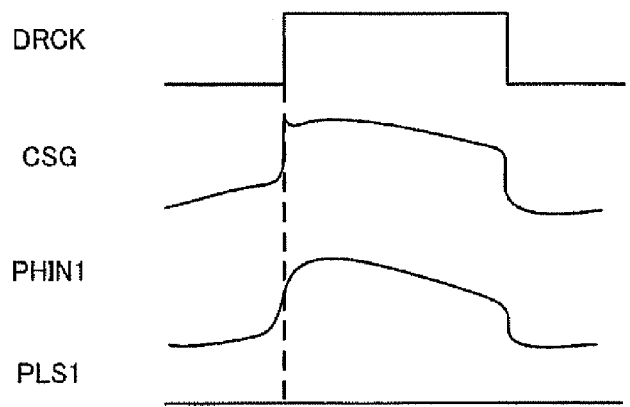
FIG. 8B MEDIUM LOAD
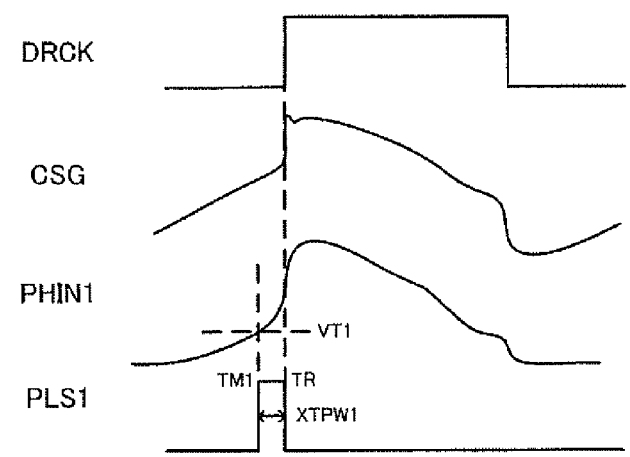
FIG. 8C HIGH LOAD
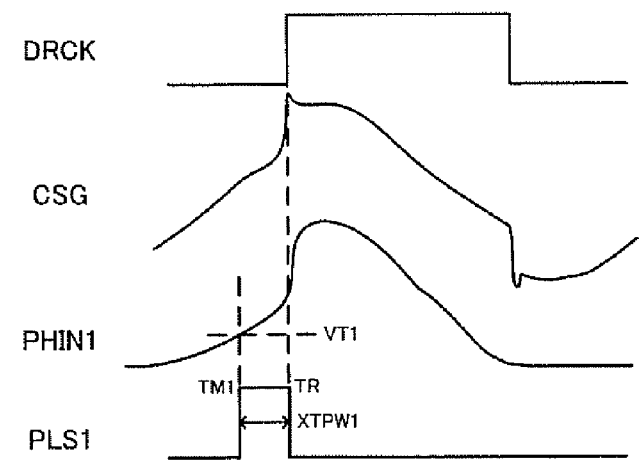

FIG. 9A  NO-LOAD
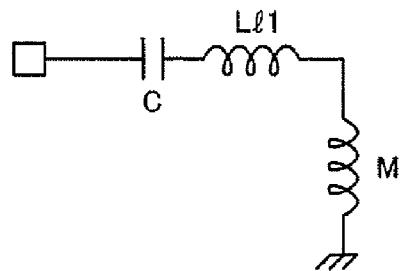
FIG. 9B  LOAD-CONNECTED
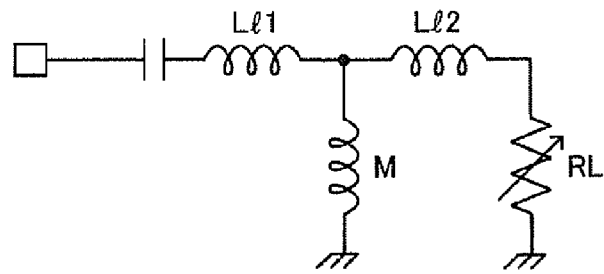
FIG. 9C
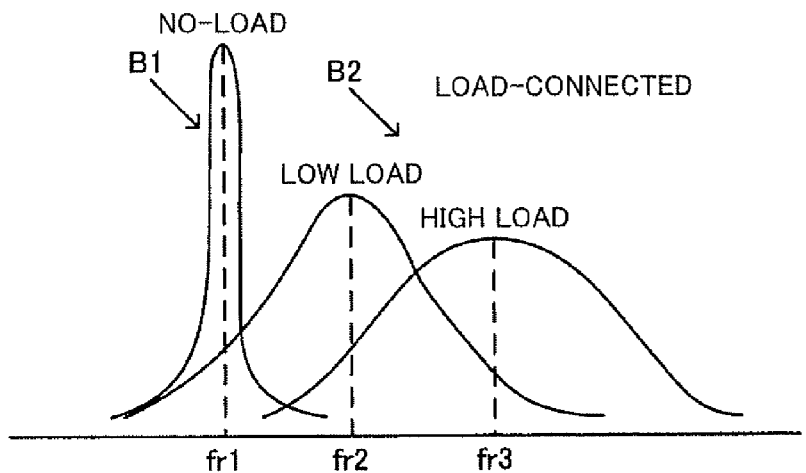

FIG. 13A LOW LOAD
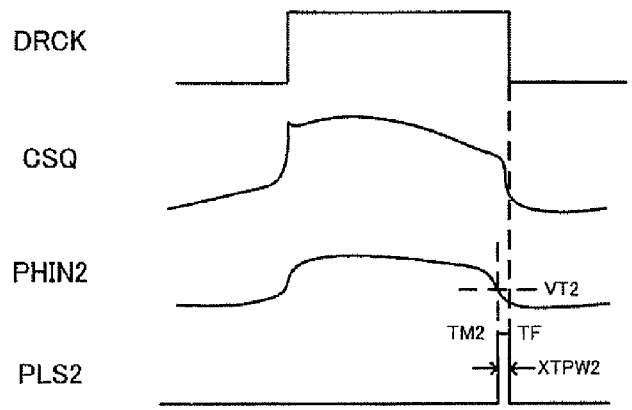
FIG. 13B MEDIUM LOAD
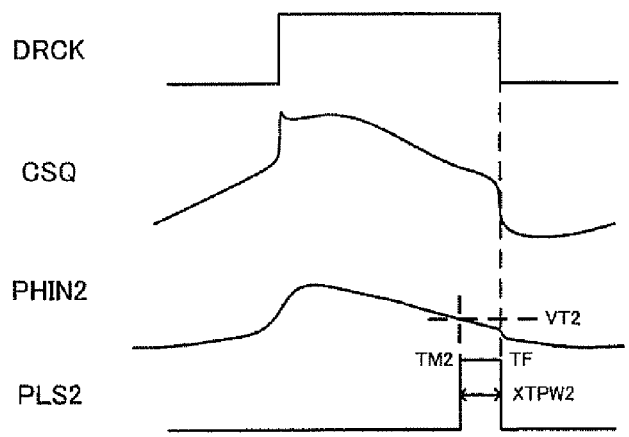
FIG. 13C HIGH LOAD
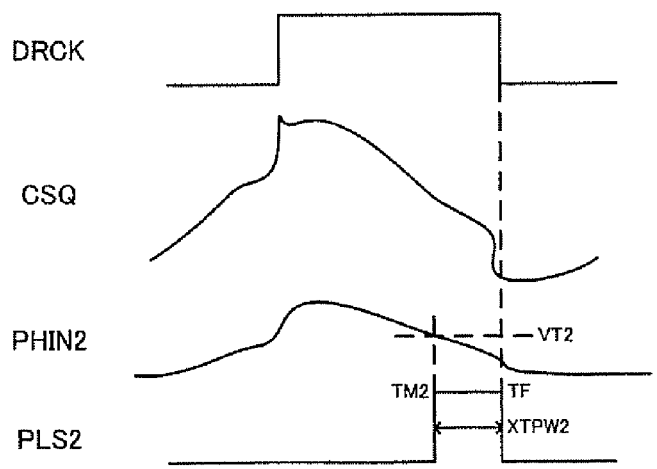

US 7,812,481 B2

POWER TRANSMISSION CONTROL DEVICE, POWER TRANSMISSION DEVICE, ELECTRONIC INSTRUMENT, AND NON-CONTACT POWER TRANSMISSION SYSTEM

Japanese Patent Application No. 2007-171346 filed on Jun. 29, 2007 and Japanese Patent Application No. 2007-184270 filed on Jul. 13, 2007, are hereby incorporated by reference in their entirety.

BACKGROUND OF THE INVENTION

The present invention relates to a power transmission control device, a power transmission device, an electronic instrument, a non-contact power transmission system, and the like.

In recent years, non-contact power transmission (contactless power transmission) that utilizes electromagnetic induction to enable power transmission without metal-to-metal contact has attracted attention. As application examples of non-contact power transmission, charging a portable telephone, charring a household appliance (e.g., cordless telephone handset), and the like have been proposed.

JP-A-2006-60909 discloses related-art non-contact power transmission. According to the technology disclosed in JP-A-2006-60909, a power transmission device (primary-side instrument) monitors the peak value of an induced voltage signal of a primary coil, and compares the peak value with a given threshold voltage to detect the power-reception-side load state, whereby a metal foreign object is detected.

According to the technology disclosed in JP-A-2006-60909, the drive frequency of the coil is set at a constant value. Therefore, the foreign object detection accuracy cannot be improved to a satisfactory level.

SUMMARY

According to one aspect of the invention, there is provided a power transmission control device provided in a power transmission device included in a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates and outputs a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

According to another aspect of the invention, there is provided a power transmission device comprising:

the above power transmission control device; and a power transmission section that generates an alternating-current voltage and supplies the alternating-current voltage to the primary coil.

According to another aspect of the invention, there is provided an electronic instrument comprising the above power transmission device.

According to another aspect of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception device including a power reception section that converts an induced voltage in the secondary coil into a direct-current voltage; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

BRIEF DESCRIPTION OF THE SEVERAL VIEWS OF THE DRAWING

FIG. 2 shows a configuration example of a power transmission device, a power transmission control device, a power reception device, and a power reception control device according to one embodiment of the invention.

FIG. 8A to 8C show signal waveform measurement results illustrative of a first pulse width detection method.

FIGS. 9A to 9C show equivalent circuits and a resonance characteristic diagram in a no-load state and a load-connected state.

FIG. 13A to 13C show signal waveform measurement results illustrative of a second pulse width detection method.

DETAILED DESCRIPTION OF THE EMBODIMENT

Figure 1A:
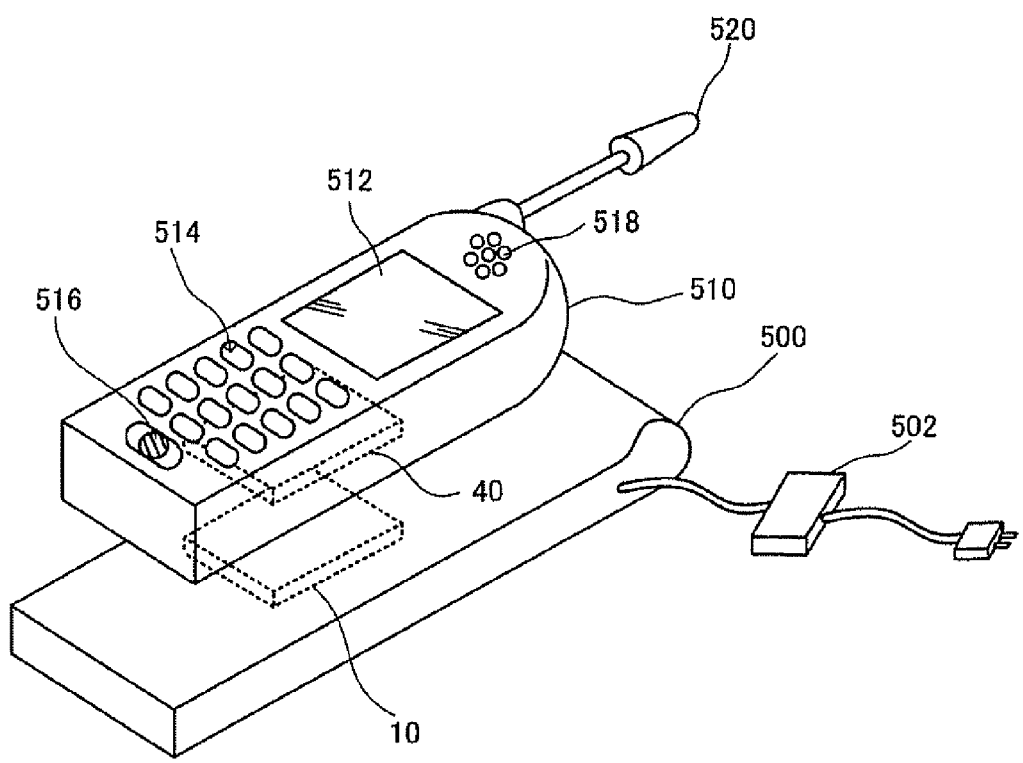
FIGS. 1A and 1B are views illustrative of non-contact power transmission.

Several aspects of the invention may provide a power transmission control device, a power transmission device, an electronic instrument, and a non-contact power transmission system capable of improving the foreign object detection accuracy.

According to one embodiment of the invention, there is provided a power transmission control device provided in a power transmission device included in a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates and outputs a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

According to this embodiment, the drive clock signal generation circuit generates and outputs the drive clock signal that specifies the drive frequency, and the driver control circuit generates the driver control signal based on the drive clock signal, and outputs the driver control signal to a power transmission driver. In this embodiment, the drive clock signal generation circuit outputs the drive clock signal set at the foreign object detection frequency differing from the normal power transmission frequency during foreign object detection. The waveform detection circuit detects a change in waveform of the induced voltage signal of the primary coil and the control circuit performs foreign object detection based on the detection result in a state in which the drive clock signal is set at the foreign object detection frequency. Therefore, foreign object detection is performed at a drive frequency differing from the drive frequency during normal power transmission, whereby the foreign object detection accuracy can be improved.

In the power transmission control device, the drive clock signal generation circuit may output the drive clock signal set at the foreign object detection frequency during foreign object detection, the foreign object detection frequency being a frequency between the normal power transmission frequency and a coil resonance frequency.

According to this configuration, the drive frequency approaches the coil resonance frequency during foreign object detection as compared with normal power transmission. This makes it possible to change (distort or deform) the waveform of the induced voltage signal with a small change in load, whereby the foreign object detection accuracy can be improved.

In the power transmission control device, the waveform detection circuit may include a pulse width detection circuit that detects pulse width information relating to the induced voltage signal; and the control circuit may perform foreign object detection based on the pulse width information.

According to this configuration, a foreign object can be stably detected by a simple configuration without employing a method that separately detects voltage and current and determines whether or not a foreign object is inserted based on the phase difference.

In the power transmission control device, the waveform detection circuit may include a first pulse width detection circuit that measures a first pulse width period to detect first pulse width information, the first pulse width period being a period between a first edge timing of the drive clock signal and a first timing, the first timing being a timing when a first induced voltage signal of the primary coil that has changed from a low-potential-side power supply voltage exceeds a first threshold voltage; and the control circuit may perform foreign object detection based on the first pulse width information.

According to this embodiment, the first pulse width period (i.e., the period between the first edge timing (e.g., falling or rising edge timing) of the drive clock signal and the first timing) is measured and detected as the first pulse width information. Foreign object detection is performed based on the detected first pulse width information. Therefore, a foreign object can be stably detected without employing a method that separately detects voltage and current and determines whether or not a foreign object is inserted based on the phase difference. According to this embodiment, since the first timing is set a timing at which the first induced voltage signal that has changed from the low-potential-side power supply voltage exceeds the first threshold voltage, the pulse width can be detected with a small variation even if the power supply voltage or the like has changed.

In the power transmission control device, the waveform detection circuit may include a first waveform adjusting circuit that adjusts a waveform of the first induced voltage signal and outputs a first waveform-adjusted signal; and the first pulse width detection circuit may measure the first pulse width period based on the first waveform-adjusted signal and the drive clock signal. This makes it possible to digitally measure the first pulse width period using the drive clock signal and a signal of which the waveform has been adjusted by the first waveform adjusting circuit.

In the power transmission control device, the first pulse width detection circuit may include a first counter that increments or decrements a count value in the first pulse width period and measures the first pulse width period based on the resulting count value.

This makes it possible to more accurately measure the first pulse width period digitally using the first counter.

In the power transmission control device, the first pulse width detection circuit may include a first enable signal generation circuit that receives the first waveform-adjusted signal and the drive clock signal and generates a first enable signal that becomes active in the first pulse width period; and the first counter may increment or decrement the count value when the first enable signal is active.

According to this configuration, since the count process that counts the pulse width period can be controlled merely by generating the first enable signal, the process can be simplified.

In the power transmission control device, the first enable signal generation circuit may include a first flip-flop circuit, the drive clock signal being input to a clock terminal of the first flip-flop circuit, a high-potential-side power supply voltage or a low-potential-side power supply voltage being input to a data terminal of the first flip-flop circuit, and the first waveform-adjusted signal being input to a reset terminal or a set terminal of the first flip-flop circuit.

According to this configuration, the enable signal can be generated by merely providing the first flip-flop circuit.

In the power transmission control device, the control circuit may perform primary foreign object detection based on the first pulse width information, the primary foreign object detection being foreign object detection before normal power transmission starts.

According to this configuration, primary foreign object detection can be implemented in a no-load state before normal power transmission starts, for example.

In the power transmission control device, the waveform detection circuit may include a second pulse width detection circuit that measures a second pulse width period to detect second pulse width information, the second pulse width period being a period between a second edge timing of the drive clock signal and a second timing, the second timing being a timing when a second induced voltage signal of the primary coil that has changed from a high-potential-side power supply voltage exceeds a second threshold voltage; and the control circuit may perform secondary foreign object detection based on the second pulse width information, the secondary foreign object detection being foreign object detection after normal power transmission has started.

According to this configuration, since a foreign object can be detected by a different standard before and after normal power transmission, foreign object detection accuracy and stability can be improved.

In the power transmission control device, the waveform detection circuit may include a second waveform adjusting circuit that adjusts a waveform of the second induced voltage signal and outputs a second waveform-adjusted signal; and the second pulse width detection circuit may measure the second pulse width period based on the second waveform-adjusted signal and the drive clock signal.

This makes it possible to digitally measure the second pulse width period using the drive clock signal and a signal of which the waveform has been adjusted by the second waveform adjusting circuit.

In the power transmission control device, the second pulse width detection circuit may include a second counter that increments or decrements a count value in the second pulse width period and measures the second pulse width period based on the resulting count value.

This makes it possible to more accurately measure the second pulse width period digitally using the second counter.

In the power transmission control device, the waveform detection circuit may include a first waveform adjusting circuit that adjusts a waveform of the first induced voltage signal and outputs a first waveform-adjusted signal to the first pulse width detection circuit; and the second waveform adjusting circuit may adjust a waveform of the second induced voltage signal differing from the first induced voltage signal, and may output the second waveform-adjusted signal to the second pulse width detection circuit.

According to this configuration, the pulse width can be detected using the first and second induced voltage signals that differ in signal state between a first method that utilizes the first waveform adjusting circuit and the first pulse width detection circuit, and a second method that utilizes the second waveform adjusting circuit and the second pulse width detection circuit. Therefore, pulse width detection accuracy and stability can be improved.

According to another embodiment of the invention, there is provided a power transmission device comprising:

one of the above power transmission control devices; and a power transmission section that generates an alternating-current voltage and supplies the alternating-current voltage to the primary coil.

According to another embodiment of the invention, there is provided an electronic instrument comprising the above power transmission device.

According to another embodiment of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception device including a power reception section that converts an induced voltage in the secondary coil into a direct-current voltage; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Electronic Instrument

FIG. 1A shows examples of an electronic instrument to which a non-contact power transmission method according to one embodiment of the invention is applied. A charger 500 (cradle) (i.e., electronic instrument) includes a power transmission device 10. A portable telephone 510 (i.e., electronic instrument) includes a power reception device 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, a power-assisted bicycle, and an IC card.

Figure 1B:
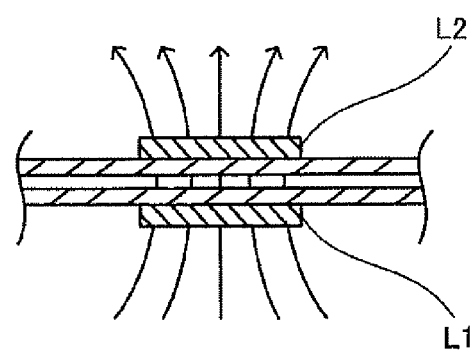

As schematically shown in FIG. 1B, power transmission from the power transmission device 10 to the power reception device 40 is implemented by electromagnetically coupling a primary coil L1 (power-transmission-side coil) provided in the power transmission device 10 and a secondary coil L2 (power-reception-side coil) provided in the power reception device 40 to form a power transmission transformer. This enables non-contact power transmission.

2. Power Transmission Device and Power Reception Device

FIG. 2 shows a configuration example of the power transmission device a power transmission control device 20, the power reception device 40, and a power reception control device 50 according to this embodiment. A power-transmission-side electronic instrument such as the charger 500 shown in FIG. 1A includes the power transmission device 10 shown in FIG. 2. A power-reception-side electronic instrument such as the portable telephone 510 may include the power reception device 40 and a load 90 (actual load). The configuration shown in FIG. 2 implements a non-contact power transmission (contactless power transmission) system that transmits power from the power transmission device 10 to the power reception device 40 by electromagnetically coupling the primary coil L1 and the secondary coil L2 (e.g., planar coil), and supplies power (voltage OUT) to the load 90 from a voltage output node NB7 of the power reception device 40.

The power transmission device 10 (power transmission module or primary module) may include the primary coil L1, a power transmission section 12, a waveform monitoring circuit 14, a display section 16, and the power transmission control device 20. The power transmission device 10 and the power transmission control device 20 are not limited to the configuration shown in FIG. 2. Various modifications may be made such as omitting some of the elements (e.g., display section or waveform monitoring circuit), adding other elements, or changing the connection relationship.

Figure 3A:
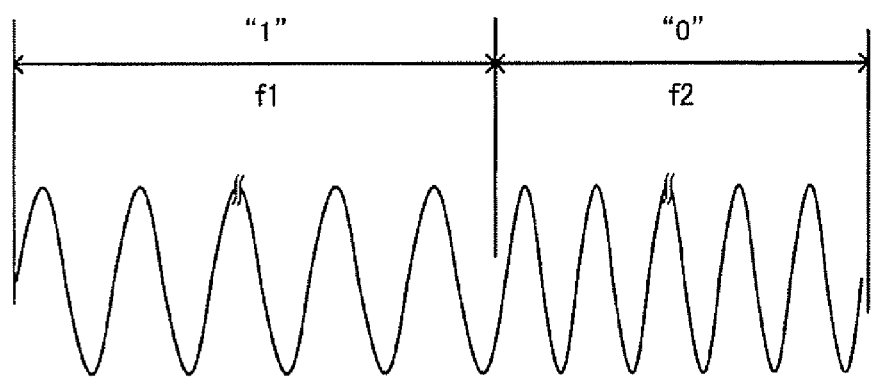
FIGS. 3A and 3B are views illustrative of data transmission by means of frequency modulation and load modulation.

The power transmission section 12 generates an alternating-current voltage at a given frequency during power transmission, and generates an alternating-current voltage at a frequency that differs depending on data during data transfer. The power transmission section 12 supplies the generated alternating-current voltage to the primary coil L1. As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example. The power transmission section 12 may include a first power transmission driver that drives one end of the primary coil L1, a second power transmission driver that drives the other end of the primary coil L1, and at least one capacitor that forms a resonant circuit together with the primary coil L1.

Each of the first and second power transmission drivers included in the power transmission section 12 is an inverter circuit (buffer circuit) that includes a power MOS transistor, for example, and is controlled by a driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B. When power transmission is unnecessary, the charger 500 and the portable telephone 510 are physically separated so that a magnetic flux of the primary coil L1 does not pass through the secondary coil L2.

The waveform monitoring circuit 14 (rectifier circuit or waveform adjusting circuit) generates a waveform-monitoring induced voltage signal PHIN based on a coil end signal CSG of the primary coil L1. For example, the coil end signal CSG (induced voltage signal) of the primary coil L1 may exceed the maximum rated voltage of an IC of the power transmission control device 20, or may be set at a negative voltage. The waveform monitoring circuit 14 receives the coil end signal CSG, generates a waveform-monitoring induced voltage signal PHIN of which the waveform can be detected by a waveform detection circuit 30 of the power transmission control device 20, and outputs the induced voltage signal PHIN to a waveform-monitoring terminal of the power transmission control device 20, for example. Specifically, the waveform monitoring circuit 14 performs a limit operation that clamps a voltage so that the maximum rated voltage is not exceeded or performs half-wave rectification so that a negative voltage is not applied to the power transmission control device 20. The waveform monitoring circuit 14 may include a resistor, a diode, and the like necessary for the limit operation, half-wave rectification, and a current limiting operation. For example, the waveform monitoring circuit 14 divides the voltage of the coil end signal CSG using a voltage divider circuit formed of a plurality of resistors or subjects the coil end signal CSG to half-wave rectification using a diode, and outputs the resulting signal to the power transmission control device 20 as the induced voltage signal PHIN.

The display section 16 displays the state (e.g., power transmission or ID authentication) of the non-contact power transmission system using a color, an image, or the like. The display section 16 is implemented by an LED, an LCD, or the like.

The power transmission control device 20 controls the power transmission device 10. The power transmission control device 20 may be implemented by an integrated circuit device (IC) or the like. The power transmission control device 20 may include a (power-transmission-side) control circuit 22, an oscillation circuit 24, a drive clock signal generation circuit 25, a driver control circuit 26, and the waveform detection circuit 30. Note that modifications may be made such as omitting some of the elements or adding other elements.

The power-transmission-side control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load state detection (e.g., data detection, foreign object detection, and removal detection), frequency modulation, and the like.

The oscillation circuit 24 includes a crystal oscillation circuit, for example. The oscillation circuit 24 generates a primary-side clock signal. The drive clock signal generation circuit 25 generates a drive clock signal that specifies a drive frequency. The driver control circuit 26 generates a control signal at a desired frequency based on the drive clock signal, a frequency setting signal from the control circuit 22, and the like, and outputs the generated control signal to the first and second power transmission drivers of the power transmission section 12 to control the first and second power transmission drivers.

The waveform detection circuit 30 detects a change in waveform of the induced voltage signal PHIN of the primary coil L1. For example, when the load state (load current) of the power-reception-side instrument (secondary-side instrument) has changed, the waveform of the induced voltage signal PHIN changes. The waveform detection circuit 30 detects such a change in waveform, and outputs the detection result (detection result information) to the control circuit 92.

Specifically, the waveform detection circuit 30 adjusts the waveform of the induced voltage signal PHIN, and generates a waveform-adjusted signal. For example, the waveform detection circuit 30 generates a square wave (rectangular wave) waveform-adjusted signal that becomes active (e.g., H level) when the induced voltage signal PHIN has exceeded a given threshold voltage. The waveform detection circuit 30 detects pulse width information (pulse width period) relating to the waveform-adjusted signal based on the waveform-adjusted signal and the drive clock signal. Specifically, the waveform detection circuit 30 receives the waveform-adjusted signal and the drive clock signal from the drive clock signal generation circuit 25, and detects the pulse width information relating to the waveform-adjusted signal to detect pulse width information relating to the induced voltage signal PHIN.

The control circuit 22 detects the load state (change in load or degree of load) of the power-reception-side instrument (power reception device 40) based on the detection result of the waveform detection circuit 30. Specifically, the control circuit 22 detects the power-reception-side load state based on the pulse width information detected by the waveform detection circuit 30 (pulse width detection circuit), and performs data (load) detection, foreign object (metal) detection, removal (detachment) detection, and the like. The pulse width period that is the pulse width information relating to the induced voltage signal chances corresponding to the power-reception-side load. The control circuit 22 detects a change in the power-reception-side load based on the pulse width period (i.e., a count value obtained by measuring the pulse width period). Therefore, when a load modulation section 46 of the power reception device 40 has transmitted data by means of load modulation (see FIG. 3B), the transmitted data can be detected.

The power reception device 40 (power reception module or secondary module) may include the secondary coil L2, the power reception section 42, the load modulation section 46, a power supply control section 48, and the power reception control device 50. Note that the power reception device 40 and the power reception control device 50 are not limited to the configuration shown in FIG. 2. Various modifications may be made such as omitting some of the elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

Figure 3B:
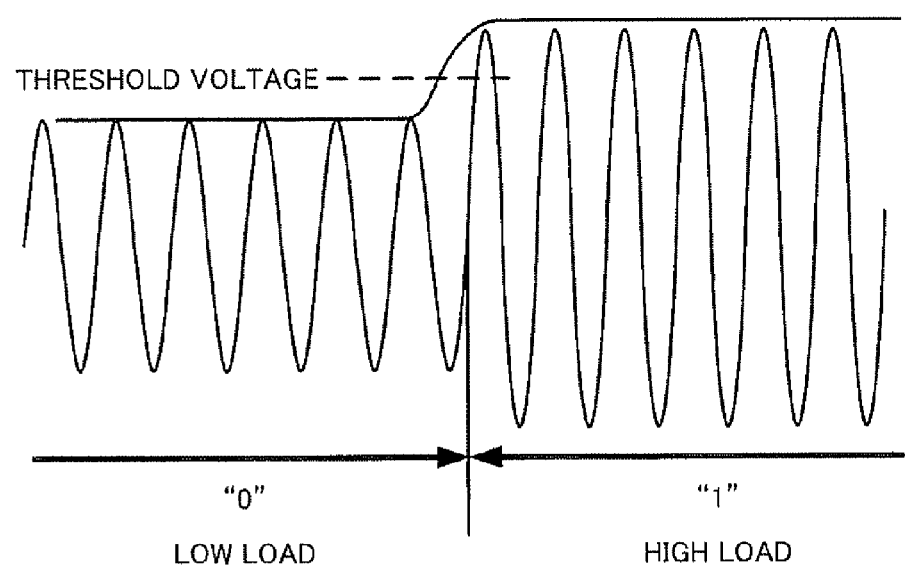

The load modulation section 46 performs a load modulation process. Specifically, when the power reception device 40 transmits desired data to the power transmission device 10, the load modulation section 46 variably changes the load of the load modulation section 46 (secondary-side instrument) corresponding to transmission data to change the signal waveform of the induced voltage in the primary coil L1 as shown in FIG. 3B. The load modulation section 46 includes a resistor RB3 and a transistor TB3 (N-type CMOS transistor) provided in series between the nodes NB3 and NB4. The transistor TB3 is ON/OFF-controlled based on a signal P3Q from a control circuit 52 of the power reception control device 50. When the load modulation section 46 performs load modulation by ON/OFF-controlling the transistor TB3, a transistor TB2 of the power supply control section 48 is turned OFF so that the load 90 is electrically disconnected from the power reception device 40.

For example, when reducing the secondary-side load (high impedance) in order to transmit data "0" (see FIG. 3B), the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls the amount of power supplied to the load 90. A regulator 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

The transistor TB2 (P-type CMOS transistor) is controlled based on a signal P1Q from the control circuit 52 of the power reception control device 50. Specifically, the transistor TB2 is turned ON when normal power transmission is performed after ID authentication has been completed (established), and is turned OFF during load modulation or the like.

The power reception control device 50 controls the power reception device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-reception-side) control circuit 52, the position detection circuit 56, an oscillation circuit 58, the frequency detection circuit 60, and a full-charge detection circuit 62.

The control circuit 52 (control section) controls the power reception device 40 and the power reception control device 50. The control circuit 52 may be implemented by a gate array, a microcomputer, or the like. Specifically, the control circuit 22 performs sequence control and a determination process necessary for ID authentication, position detection, frequency detection, load modulation, full-charge detection, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate. Specifically, the position detection circuit 56 TO converts the signal ADIN into a binary value using a comparator or determines the level of the signal ADIN by A/D conversion, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmission device 10 is "1" or "0", as shown in FIG. 3A.

The full-charge detection circuit 62 (charge detection circuit) is a circuit that detects whether or not a battery 94 (secondary battery) of the load 90 has been fully charged (charged).

The load 90 may include a charge control device 92 that controls charging of the battery 94 and the like. The charge control device 92 (charge control IC) may be implemented by an integrated circuit device or the like. The battery 94 may be provided with the function of the charge control device 92 (e.g., smart battery).

Figure 4:
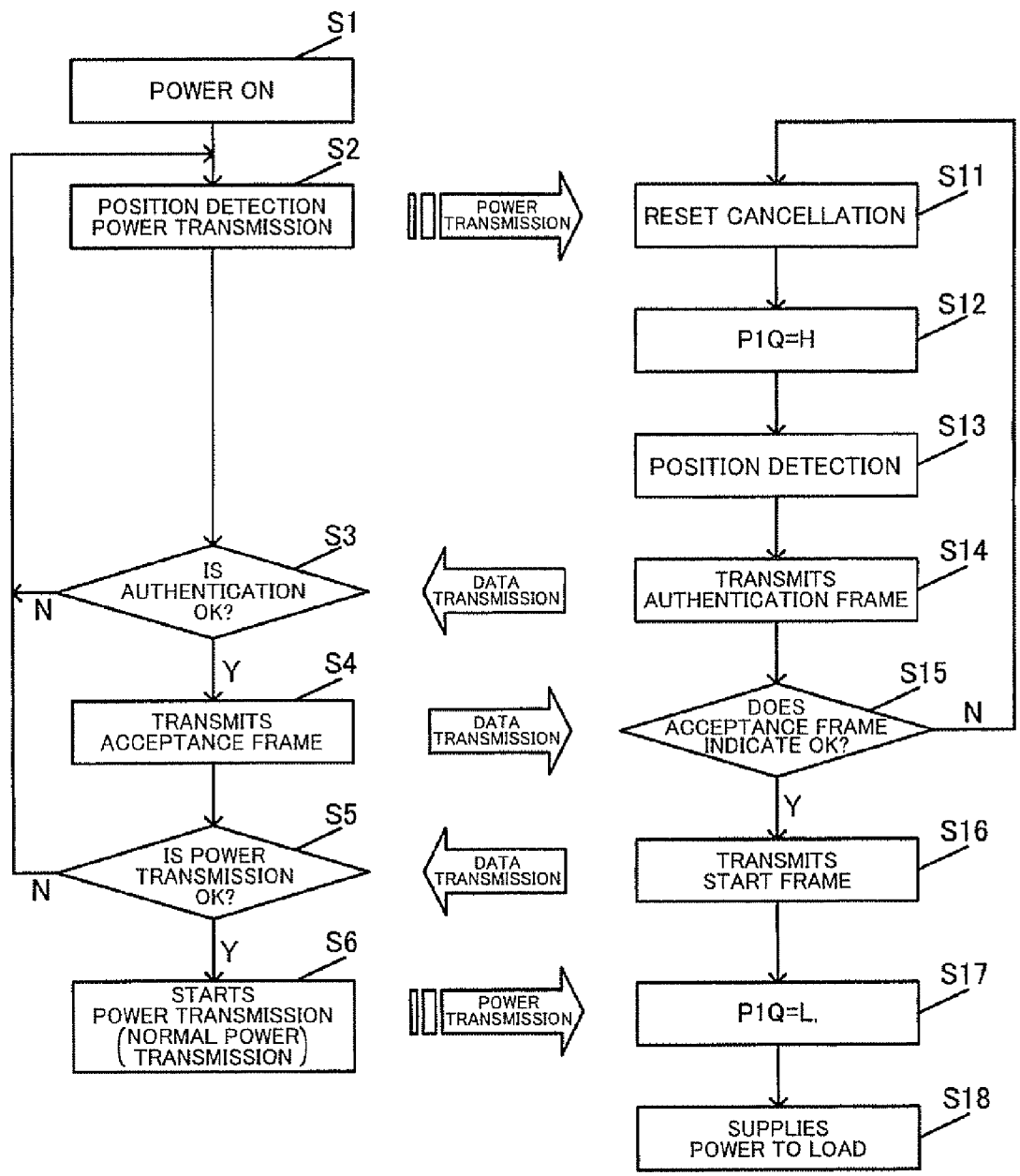
FIG. 4 shows a flowchart illustrative of an outline of a power-transmission-side operation and a power-reception-side operation.

An outline of the power-transmission-side operation and the power-reception-side operation is described below using a flowchart shown in FIG. 4. When power has been supplied to the power-transmission-side instrument (step S1), the power-transmission-side instrument performs temporary power transmission for position detection (step S2). The power-reception-side power supply voltage rises due to power transmission so that the reset state of the power reception control device 50 is canceled (step S11). The power-reception-side instrument then sets the signal P1Q at the H level (step S12). This causes the transistor TB2 to be turned OFF so that the load 90 is electrically disconnected from the power reception device 40.

The power-reception-side instrument then determines whether or not the positional relationship between the primary coil L1 and the secondary coil L2 is appropriate using the position detection circuit 56 (step S13). When the power-reception-side instrument has determined that the positional relationship between the primary coil L1 and the secondary coil L2 is appropriate, the power-reception-side instrument starts an ID authentication process and transmits an authentication frame to the power-transmission-side instrument (step S14). Specifically, the power-reception-side instrument transmits data relating to the authentication frame by means of load modulation described with reference to FIG. 3B.

When the power-transmission-side instrument has received the authentication frame, the power-transmission-side instrument performs the ID determination process or the like (step S3). When the power-transmission-side instrument accepts the ID authentication, the power-transmission-side instrument transmits an acceptance frame to the power-reception-side instrument (step S4). Specifically, the power-transmission-side instrument transmits data by means of frequency modulation described with reference to FIG. 3A.

The power-reception-side instrument receives the acceptance frame. When the acceptance frame indicates OK, the power-reception-side instrument transmits a start frame for starting non-contact power transmission to the power-transmission-side instrument (steps S15 and S16). The power-transmission-side instrument receives the start frame. When the start frame indicates OK, the power-transmission-side instrument starts normal power transmission (steps S5 and S6). The power-reception-side instrument sets the signal P1Q at the L level (step S17). This causes the transistor TB2 to be turned ON so that power can be transmitted to the load 90. Power is then supplied to the load (i.e., the voltage VOUT is output to the load) (step S18).

3. Foreign Object Detection Frequency

Figure 5:
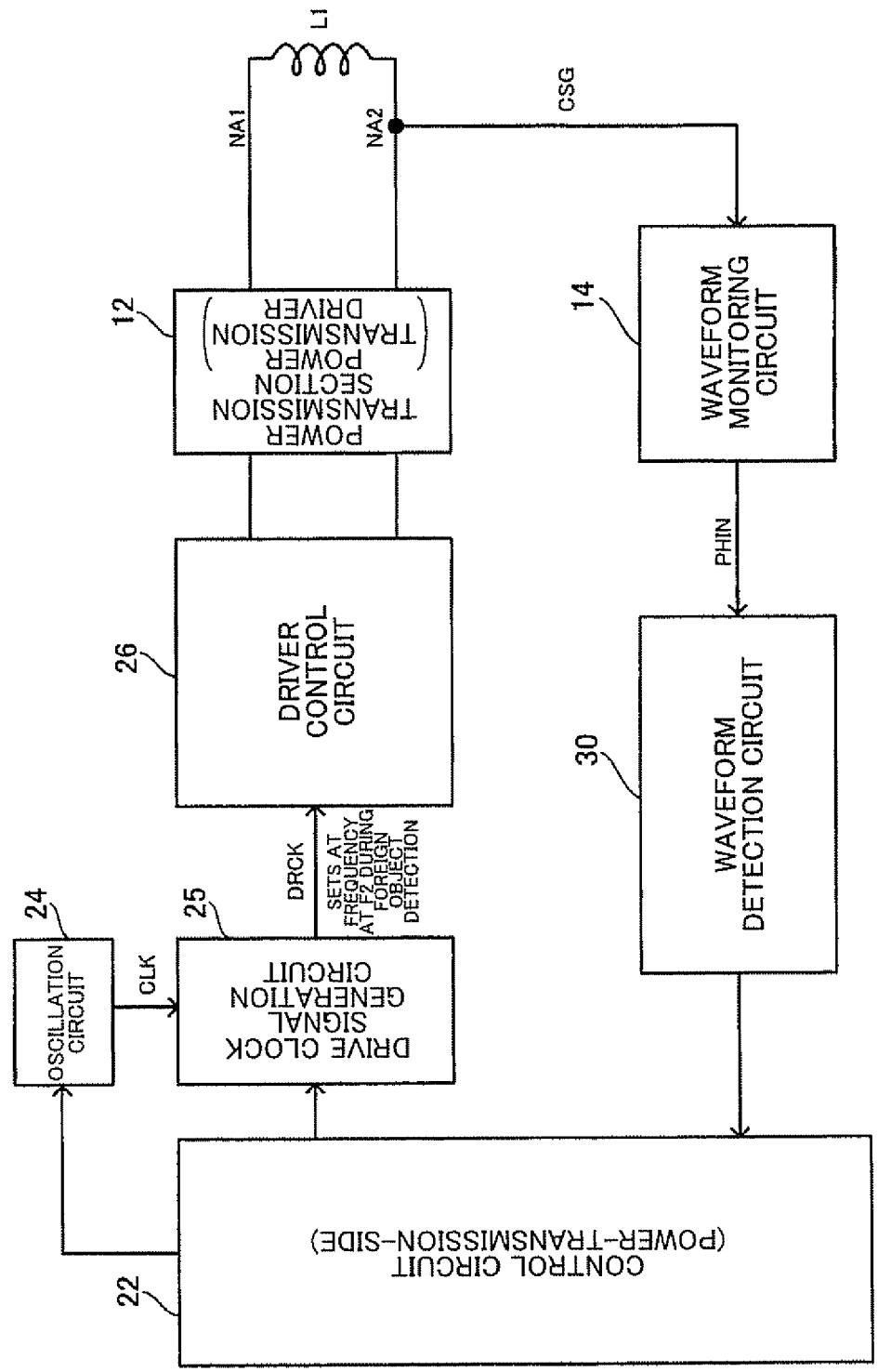
FIG. 5 shows a configuration example of a power transmission control device according to one embodiment of the invention.

FIG. 5 shows a configuration example of the power transmission control device 20 according to this embodiment. Note that the power transmission control device 20 according to this embodiment is not limited to the configuration shown in FIG. 5. Various modifications may be made such as omitting some of the elements (e.g., waveform monitoring circuit) or adding other elements.

In FIG. 5, the drive clock signal generation circuit 25 generates a drive clock signal DRCK that specifies the drive frequency of the primary coil L1. Specifically, the drive clock signal generation circuit 25 generates the drive clock signal DRCK by dividing the frequency of a reference clock signal CLK generated by the oscillation circuit 24. An alternating-current voltage at a drive frequency specified by the drive clock signal DRCK is supplied to the primary coil L1.

The driver control circuit 26 generates a driver control signal based on the drive clock signal DRCK, and outputs the driver control signal to the power transmission drivers (first and second power transmission drivers) of the power transmission section 12 that drives the primary coil L1. In this case, in order to prevent a shoot-through current from flowing through the inverter circuit of the power transmission driver, the driver control circuit 26 generates the driver control signal so that a signal input to the gate of a P-type transistor of the inverter circuit does not overlap a signal input to the gate of an N-type transistor of the inverter circuit.

The waveform detection circuit 30 detects a change in waveform of the induced voltage signal PHIN of the primary coil L1. The control circuit 22 performs foreign object detection based on the detection result of the waveform detection circuit 30.

For example, the waveform detection circuit 30 detects the pulse width information relating to the induced voltage signal PHIN. The control circuit 22 performs foreign object detection based on the detected pulse width information. Specifically, the waveform detection circuit 30 detects the pulse width information using a first pulse width detection method described later, and the control circuit 22 performs foreign object detection based on the detected pulse width information. For example, the pulse width detection circuit 33 measures the pulse width period from the edge timing of the drive clock signal to the timing at which the induced voltage signal PHIN (coil end signal CSG) has exceeded a given threshold voltage.

The waveform detection circuit 30 may detect the pulse width information using a second pulse width detection method described later. For example, the pulse width detection circuit 33 measures the pulse width period from the edge timing of the drive clock signal to the timing at which the induced voltage signal PHIN (coil end signal CSG) has become lower than a given threshold voltage.

The waveform detection circuit 30 may detect the pulse width using the first method and the second method. For example, primary foreign object detection may be performed using the first method before normal power transmission starts, and secondary foreign object detection may be performed using the second method after normal power transmission has started.

A foreign object may be detected by causing the waveform detection circuit 30 to determine phase characteristics due to load. For example, a foreign object may be detected by detecting the voltage/current phase difference. Alternatively, a foreign object may be detected by monitoring the peak value of the induced voltage signal PHIN and detecting a change in the peak value.

In this embodiment, the drive clock signal DRCK (including a signal equivalent to the drive clock signal) is set at a foreign object detection frequency F2 differing from a normal power transmission frequency F1 during foreign object detection (foreign object detection period or foreign object detection mode). Specifically, the control circuit 22 outputs a drive frequency change instruction signal to the drive clock signal generation circuit 25 during foreign object detection (e.g., primary foreign object detection). This causes the drive clock signal generation circuit 25 to generate and output the drive clock signal DRCK set at the foreign object detection frequency F2 during foreign object detection. For example, the drive clock signal generation circuit 25 changes the drive frequency from the normal power transmission frequency F1 to the foreign object detection frequency F2 by changing the dividing ratio of the reference clock signal CLK, and outputs the drive clock signal DRCK set at the frequency F2 to the driver control circuit 26. The driver control circuit 26 generates the driver control signal set at the frequency F2 to control the power transmission driver. The foreign object detection frequency F2 may be set at a frequency between the normal power transmission frequency F1 and a coil resonance frequency F0, for example.

Figure 6A:
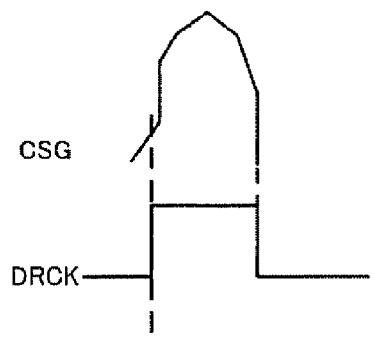
FIG. 6A to 6C are views illustrative of a frequency setting method according to one embodiment of the invention.
Figure 6B:
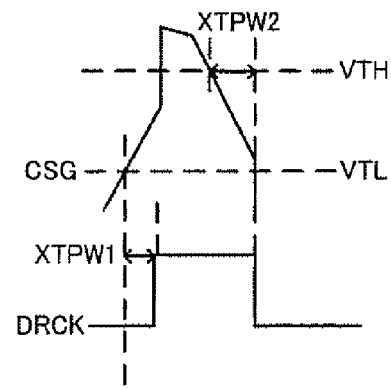

FIG. 6A shows a signal waveform example of the coil end signal CSG when the power-reception-side (secondary-side) load is low (i.e., the load current is small), and FIG. 6B shows a signal waveform example of the coil end signal CSG when the power-reception-side (secondary-side) load is high (i.e., the load current is large). As shown in FIGS. 6A and 6B, the waveform of the coil end signal CSG is distorted as the power-reception-side load increases.

In the low-load state shown in FIG. 6A, a square wave (drive waveform) (i.e., the waveform of the drive clock signal DRCK) is predominant over a sine wave (coil resonance waveform), as described later. In the high-load state shown in FIG. 6B, a sine wave (resonance waveform) is predominant over a square wave (drive waveform) so that the waveform is distorted.

The first pulse width detection method described later detects a pulse width period XTPW1 when the coil end signal CSG rises (see FIG. 6B) to detect a change in load due to foreign object insertion. The second pulse width detection method detects a pulse width period XTPW2 when the coil end signal CSG falls to detect a change in load due to foreign object insertion. In FIG. 6B, a change in load due to foreign object insertion is detected by detecting that the coil end signal CSG changes from a signal waveform in which a square wave is predominant to a signal waveform in which a sine wave is predominant.

Figure 6C:
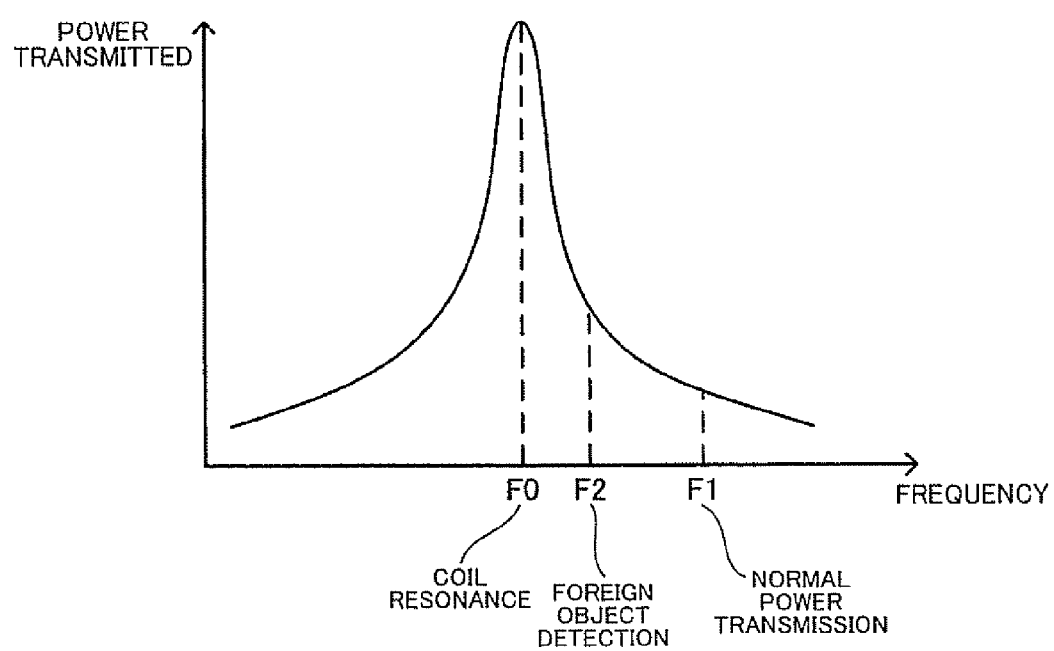

In this embodiment, the drive frequency is set at the foreign object detection frequency F2 differing from the normal power transmission frequency F1 during foreign object detection, as shown in FIG. 6C. Specifically, the drive frequency is set at the foreign object detection frequency F2 between the normal power transmission frequency F1 and the coil resonance frequency F0 (i.e., the resonance frequency of the resonant circuit formed by the coil and the like).

The waveform of the coil end signal CSG (induced voltage signal) can be distorted to a large extent during foreign object detection by changing the drive frequency from the normal power transmission frequency F1 to the foreign object detection frequency F2 to approach the coil resonance frequency F0.

Specifically, a sine wave (resonance waveform) becomes predominant as the drive frequency approaches the resonance frequency, as describe later with reference to FIG. 9C. Therefore, when the drive frequency is set at the foreign object detection frequency F2 close to the resonance frequency F0, a sine wave becomes predominant as compared with the case of setting the drive frequency at the normal power transmission frequency F1, whereby the waveform is distorted to a larger extent. Specifically, foreign object detection can be performed in a frequency band where a chance in pulse width (phase) easily occurs. This increases the foreign object detection sensitivity so that the foreign object detection accuracy increases. Specifically, since the waveform changes to a large extent due to a small change in load so that the pulse width periods XTPW1 and XTPW2 change to a large extent, a small metal foreign object or the like can be easily detected.

For example, the drive frequency F1 during normal power transmission is set at a frequency away from the resonance frequency F0 from the viewpoint of power transmission efficiency and current consumption, and the frequency F2 close to the resonance frequency F0 is not generally used during normal power transmission.

However, since the transistor TB2 shown in FIG. 2 is turned OFF so that power transmission to the load 90 is stopped during foreign object detection (primary foreign object detection) before normal power transmission starts, the power-reception-side load is almost zero. Therefore, since power transmission efficiency and power consumption need not be taken into consideration during foreign object detection, the foreign object detection frequency F2 can be set at a frequency close to the resonance frequency F0 without causing a problem. In this embodiment, the drive frequency is set at the frequency F2 between the frequencies F0 and F1 from the above-described point of view.

The first pulse width detection method reduces a variation in pulse width detection due to a change in power supply voltage and the like as compared with the second pulse width detection method, but has low sensitivity to a change in load, as described later. On the other hand, since the amount of distortion of the waveform due to a change in load increases by setting the foreign object detection frequency F2 at a frequency close to the resonance frequency F0 during foreign object detection using the first pulse width detection method, the sensitivity to a change in load can be improved.

Note that various methods such as a phase detection method and a peak voltage detection method may be employed for the waveform detection circuit 30 in addition to the pulse width detection method. In this case, the foreign object detection frequency F2 may be set at a frequency appropriate for each method. For example, the foreign object detection frequency F2 may be set at a frequency higher than the normal power transmission frequency F1.

4. First Modification

Figure 7:
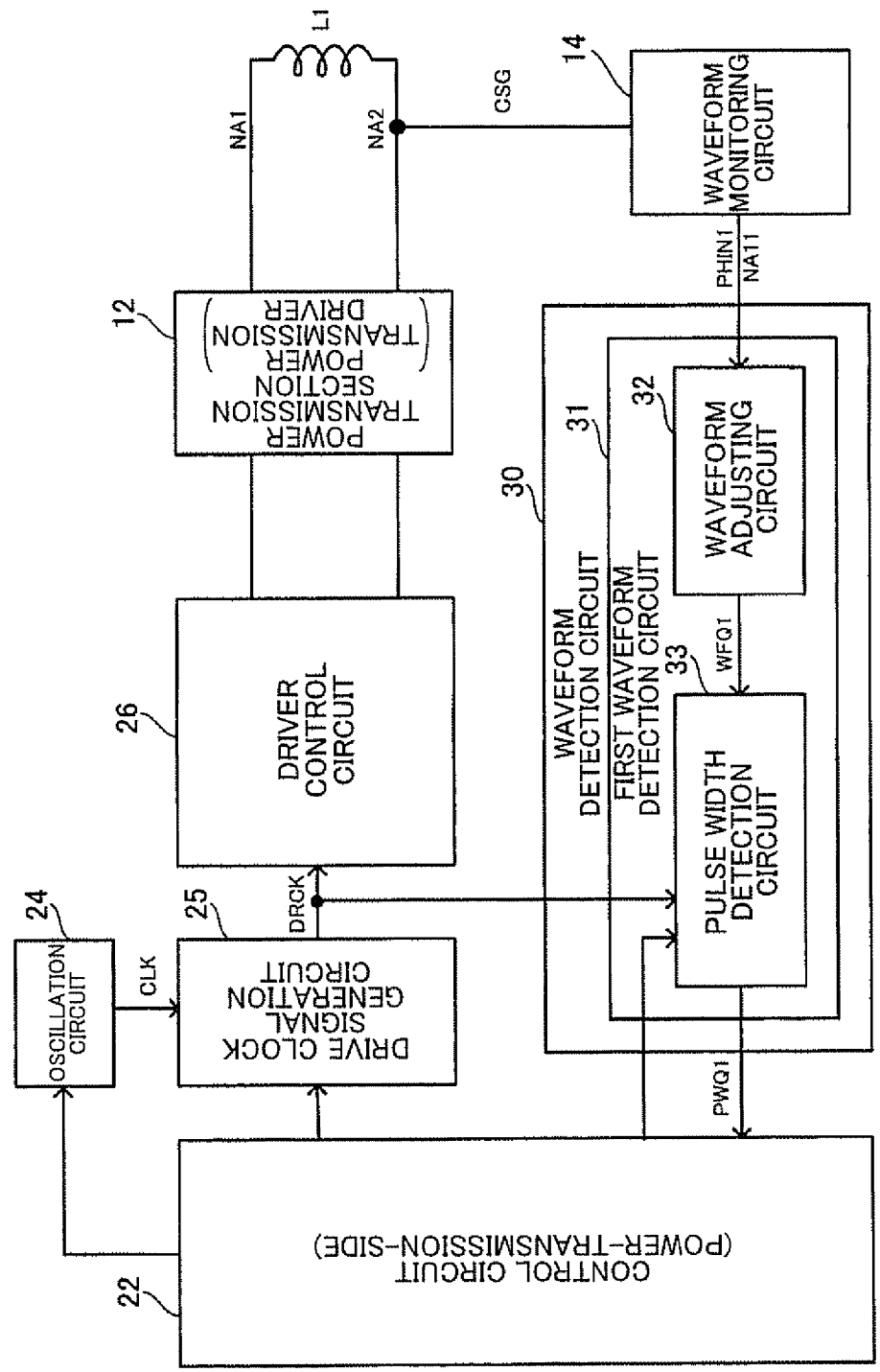
FIG. 7 shows a configuration example according to a first modification of one embodiment of the invention.

FIG. 7 shows a first modification of this embodiment. In FIG. 7, when the inductance of the primary coil L1, the capacitance of the capacitor that forms the resonant circuit, the power supply voltage, or the distance or the positional relationship between the primary coil L1 and the secondary coil L2, or the like has changed, the voltage peak (amplitude) of an induced voltage signal PHIN1 also changes. Therefore, a change in load may not be accurately detected by merely detecting the peak voltage of the induced voltage signal PHIN. In FIG. 7, a change in load due to foreign object insertion or the like is detected by detecting the pulse width information relating to the induced voltage signal PHIN.

In FIG. 7, the waveform detection circuit 30 includes a first waveform detection circuit 31 that detects a change in waveform of the first induced voltage signal PHIN1 of the primary coil L1. The first waveform detection circuit 31 includes a first waveform adjusting circuit 32 and a first pulse width detection circuit 33. The waveform adjusting circuit 32 (pulse signal generation circuit) adjusts the waveform of the induced voltage signal PHIN1 of the primary coil L1, and outputs a waveform-adjusted signal WFQ1. Specifically, the waveform adjusting circuit 32 outputs a square wave (rectangular wave) waveform-adjusted signal WFQ1 (pulse signal) that becomes active (e.g., H level) when the signal PHIN1 has exceeded a given threshold voltage, for example.

The pulse width detection circuit 33 detects pulse width information relating to the induced voltage signal PHIN1 of the primary coil L1. Specifically, the pulse width detection circuit 33 receives the waveform-adjusted signal WFQ1 from the waveform adjusting circuit 32 and the drive clock signal DRCK (drive control signal) from the drive clock signal generation circuit 25, and detects the pulse width information relating to the waveform-adjusted signal WFQ1 to detect the pulse width information relating to the induced voltage signal PHIN1.

For example, a timing at which the induced voltage signal PHIN1 that has changed from a voltage GND (low-potential-side power supply voltage) exceeds a first threshold voltage VT1 is referred to as a first timing. In this case, the pulse width detection circuit 33 measures a first pulse width period that is a period between a first edge timing (e.g. falling edge timing) of the drive clock signal DRCK and the first timing to detect first pulse width information. For example, the pulse width detection circuit 33 measures the first pulse width period in which the voltage signal PHIN1 induced by a change in voltage of the drive clock signal DRCK becomes equal to or lower than the given threshold voltage VT1. The pulse width detection circuit 33 measures the pulse width of the waveform-adjusted signal WFQ1 (induced voltage signal) with respect to the pulse width of the drive clock signal DRCK. In this case, the first pulse width period is measured using the reference clock signal CLK, for example. A latch circuit (not shown) latches measurement result data PWQ1 obtained by the pulse width detection circuit 33, for example. Specifically, the pulse width detection circuit 33 measures the first pulse width period using a counter that increments (or decrements) the count value based on the reference clock signal CLK, and the latch circuit latches the measurement result data PWQ1.

The control circuit 22 detects the power-reception-side (secondary-side) load state (change in load or degree of load) based on the pulse width information detected by the pulse width detection circuit 33. Specifically, the control circuit 22 performs foreign object detection (primary foreign object detection) based on the pulse width information detected by the pulse width detection circuit 33. The control circuit 22 may detect data transmitted from the power reception device 40 by means of load modulation.

FIGS. 8A to 8C show measurement results for the signal waveforms of the drive clock signal DRCK, the coil end signal CSG, the induced voltage signal PHIN1, and a pulse signal PLS1. FIGS. 8A, 8B, and 8C show signal waveforms (voltage waveforms) in a low-load state (e.g., secondary-side load current =0 mA), a medium-load state (load current =70 mA), and a high-load state (load current =150 mA), respectively. The pulse signal PLS1 used for pulse width detection is a signal that is set at the H level at a first timing TM1 at which the induced voltage signal PHIN1 exceeds the first threshold voltage VT1, and is set at the L level at a rising edge timing TR of the drive clock signal DRCK. As the threshold voltage VT1 (e.g., a threshold voltage of an N-type transistor) used to measure the pulse width period, a voltage at which the load state detection accuracy is optimized may be appropriately selected.

As shown in FIGS. 8A to 8C, the pulse width period XTPW1 of the pulse signal PLS1 increases as the power-reception-side load increases (i.e., the load current increases). Therefore, the power-reception-side load state (degree of load) can be detected by measuring the pulse width period XTPW1. For example, when a foreign object such as a metal foreign object has been placed on the primary coil L1 (inserted between the primary coil L1 and the secondary coil L2), power is supplied to the foreign object from the primary-side instrument, whereby the power-reception-side instrument is overloaded. In this case, the overload state can be detected by measuring the pulse width period XTPW1 so that foreign object detection (primary foreign object detection) can be implemented. Moreover, whether the data transmitted from the power-reception-side instrument is "0" or "1" can be detected by determining the degree of load of the load modulation section 46 of the power reception device 40 by measuring the pulse width period XTPW1.

In FIGS. 8A to 8C, the period from the timing TM1 to the rising edge timing TR of the drive clock signal DRCK is defined as the pulse width period XTPW1. In this case, the first waveform detection circuit 31 detects the pulse width period XTPW1 of the pulse signal PLS1 as the first pulse width information. Note that it is desirable that the period from a falling edge timing TF of the drive clock signal DRCK to the timing TM1 be specified as the pulse width period TPW1 (see FIG. 11), and the first waveform detection circuit 31 detect the pulse width period TPW1 as the first pulse width information. This prevents a situation in which the pulse width period is measured while regarding a noise signal as a pulse signal when the power-reception-side load is low. In this case, the pulse width period TPW1 decreases as the power-reception-side load increases. This makes it possible to determine that a foreign object has been placed (inserted) on the primary coil L1 when the pulse width period TPW1 (pulse width count) has become shorter than a given period (given count), whereby foreign object detection can be implemented.

FIG. 9A shows a primary-side equivalent circuit in a no-load state, and

FIG. 9B shows a primary-side equivalent circuit in a load-connected state. As shown in FIG. 9A, a series resonant circuit is formed by a capacitance C, a primary-side leakage inductance LI1, and a coupling inductance M. Therefore, the resonance characteristics in a no-load state have a sharp profile with a high Q value, as indicated by B1 in FIG. 9C. A secondary-side leakage inductance LI2 and a resistance RL of the secondary-side load are added in a load-connected state. Therefore, resonance frequencies fr2 and fr3 in a load-connected state are higher than a resonance frequency fr1 in a no-load state, as shown in FIG. 9C. The resonance characteristics in a load-connected state have a gentle profile with a low Q value due to the effect of the resistance RL. The resonance frequency increases as the load increases from a low-load state (RL: high) to a high-load state (RL: low), and approaches the drive frequency of the coil (frequency of the drive clock signal DRCK).

When the resonance frequency approaches the drive frequency, a sine wave (resonance waveform) is gradually observed. In the voltage waveform in a low-load state shown in FIG. 8A, a square wave (drive waveform) is predominant over a sine wave (resonance waveform). In the voltage waveform in a high-load state shown in FIG. 8C, a sine wave (resonance waveform) is predominant over a square wave (drive waveform). As a result, the pulse width period XTPW1 (the pulse width period TPW1 decreases) increases as the load increases. Therefore, a change (degree) in power-reception-side load can be determined using a simple configuration by measuring the pulse width period XTPW1 (TPW1).

For example, a change in power-reception-side load due to insertion of a metal foreign object or the like may be determined by detecting only a change in peak voltage of the coil end signal. However, the peak voltage also changes due to the distance or the positional relationship between the primary coil L1 and the secondary coil L2 in addition to a change in load. Therefore, a variation in load change detection increases.

In the pulse width detection method according to this embodiment, a change in load is detected by measuring the pulse width period that changes due to the power-reception-side load state by digital processing instead of detecting the peak voltage. Therefore, a change in load can be detected with a small variation.

A change in power-reception-side load may be determined based on phase characteristics due to load. The term "phase characteristics due to load" used herein refers to a voltage/current phase difference. This method complicates the circuit configuration and increases cost.

In the pulse width detection method according to this embodiment, since digital data can be processed using a simple waveform adjusting circuit and a counter circuit (counter) utilizing the voltage waveform, the circuit configuration can be simplified. Moreover, the pulse width detection method according to this embodiment can be easily combined with the amplitude detection method that detects a change in load by detecting the peak voltage.

In the pulse width detection method according to this embodiment, the pulse width period XTPW1 specified by the timing TM1 at which the induced voltage signal PHIN1 that has changed from 0 V (GND) exceeds the threshold voltage VT1 is measured, as shown in FIGS. 8A to 8C. Therefore, an adverse effect due to a change in power supply voltage or a change in distance or positional relationship between the coils can be reduced by setting the threshold voltage VT1 at a value close to 0 V, whereby a change in load can be detected with a further reduced variation.

Figure 10:
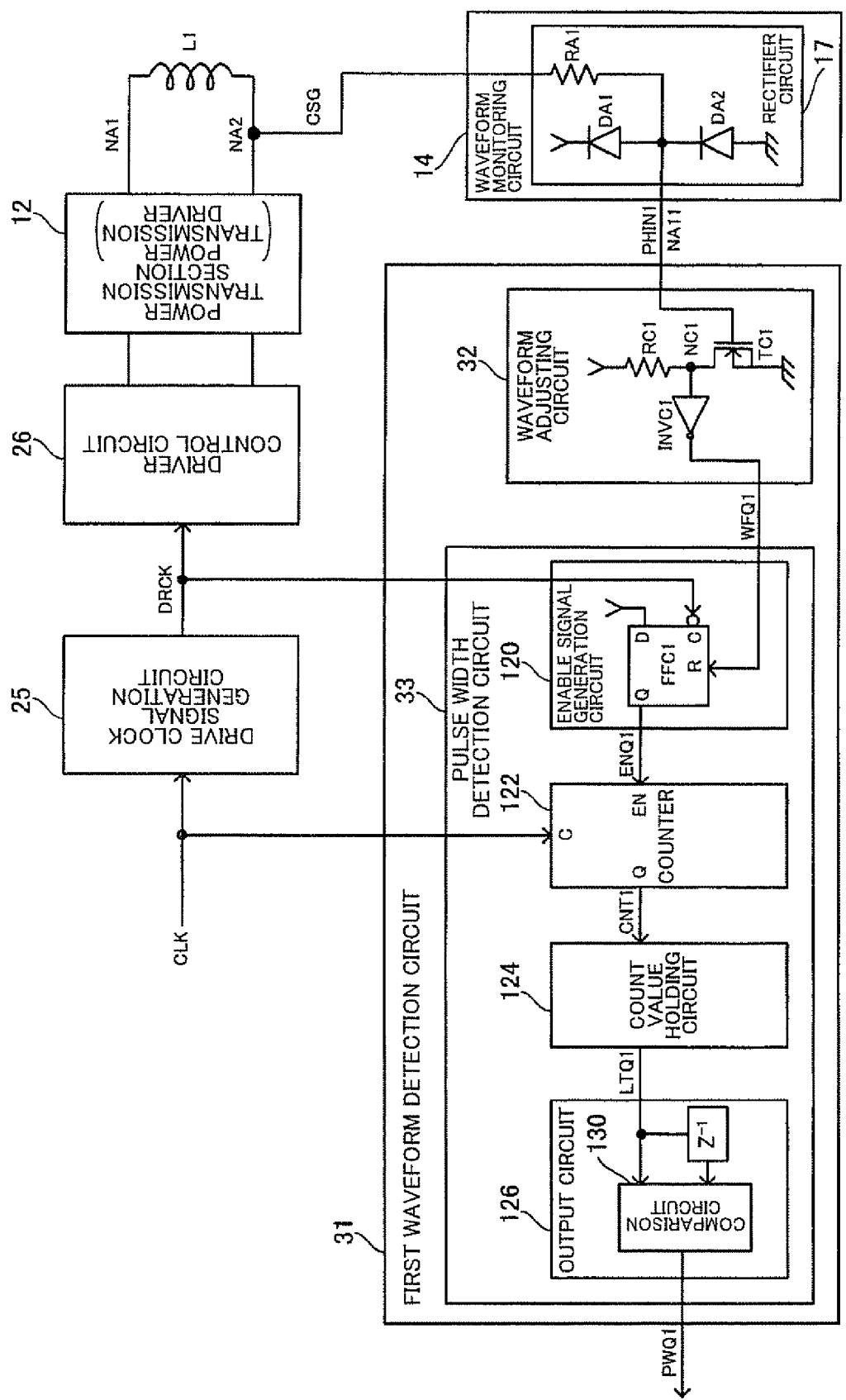
FIG. 10 shows a specific configuration example of the first modification.

FIG. 10 shows a specific configuration example of the power transmission control device 20 and the waveform monitoring circuit 14 according to the first modification. The waveform monitoring circuit 14 includes a first rectifier circuit 17 having a limiter function. The rectifier circuit 17 includes a current-limiting resistor RA1 provided between a coil end node NA2 at which the coil end signal CSG of the primary coil L1 is generated and a first monitor node NA11 at which the waveform-monitoring induced voltage signal PHIN1 is generated. The rectifier circuit 17 performs a limiter operation that clamps the induced voltage signal PHIN1 at a voltage VDD (high-potential-side power supply voltage), and subjects the induced voltage signal PHIN1 to half-wave rectification.

A situation in which an overcurrent from the coil end node NA2 flows into an IC terminal of the power transmission control device 20 is prevented by providing the current-limiting resistor RA1. A situation in which a voltage equal to or higher than the maximum rated voltage is applied to the IC terminal of the power transmission control device 20 is also prevented by causing the rectifier circuit 17 to clamp the induced voltage signal PHIN1 at the voltage VDD. Moreover, a situation in which a negative voltage is applied to the IC terminal of the power transmission control device 20 is prevented by causing the rectifier circuit 17 to subject the induced voltage signal PHIN1 to half-wave rectification.

Specifically, the rectifier circuit 17 includes a first diode DA1 provided between the monitor node NA11 and a VDD (high-potential-side power supply in a broad sense) node, the forward direction of the first diode DA1 being a direction from the monitor node NA11 to the VDD node. The rectifier circuit 17 also includes a second diode DA2 provided between the monitor node NA11 and a GND (low-potential-side power supply in a broad sense) node, the forward direction of the second diode DA2 being a direction from the GND node to the monitor node NA11. The VDD limit operation is implemented using the diode DA1, and half-wave rectification is implemented using the diode DA2.

Note that a Zener diode may be provided instead of the diode DA1. Specifically, a Zener diode may be provided between the monitor node NA11 and the GND (low-potential-side power supply) node, the forward direction of the Zener diode being a direction from the GND node to the monitor node NA11.

The waveform adjusting circuit 32 (first waveform adjusting circuit) includes a resistor RC1 and an N-type transistor TC1 connected in series between the power supply VDD (high-potential-side power supply) and the power supply GND (low-potential-side power supply), and an inverter circuit INVC. The induced voltage signal PHIN1 from the waveform monitoring circuit 14 is input to the gate of the transistor TC1. When the signal PHIN1 has exceeded the threshold voltage of the transistor TC1, the transistor TC1 is turned ON so that the voltage of a node NC1 is set at the L level. Therefore, the waveform-adjusted signal WFQ1 is set at the H level. When the signal PHIN1 has become lower than the threshold voltage, the waveform-adjusted signal WFQ1 is set at the L level. The pulse width detection circuit 33 includes a first counter 122. The counter 122 increments (or decrements) the count value in the pulse width period, and measures the pulse width period (first pulse width period) based on the resulting count value. In this case, the counter 122 counts the count value based on the reference clock signal CLK, for example.

More specifically, the pulse width detection circuit 33 includes a first enable signal generation circuit 120. The enable signal generation circuit 120 receives the first waveform-adjusted signal WFQ1 and the drive clock signal DRCK, and generates a first enable signal ENQ1 that becomes active in the first pulse width period. The counter 122 increments (or decrements) the count value when the enable signal ENQ1 is active (e.g., H level).

The enable signal generation circuit 120 may be formed using a flip-flop circuit FFC1 the drive clock signal DRCK (including a signal equivalent to the drive clock signal DRCK) being input to a clock terminal (inverting clock terminal) of the flip-flop circuit FFC1, a voltage VDD (high-potential-side power supply voltage) being input to a data terminal of the flip-flop circuit FFC1, and the waveform-adjusted signal WFQ1 (including a signal equivalent to the waveform-adjusted signal WFQ1) being input to a reset terminal (non-inverting reset terminal) of the flip-flop circuit FFC1. When the waveform-adjusted signal WFQ1 is set at the L level and the drive clock signal DRCK is then set at the L level, the enable signal ENQ1 (i.e., output signal) from the flip-flop circuit FFC1 is set at the H level (active). When the waveform-adjusted signal WFQ1 is set at the H level, the flip-flop circuit FFC1 is reset so that the enable signal ENQ1 (output signal) from the flip-flop circuit FFC1 is set at the L level (inactive). Therefore, the counter 122 can measure the pulse width period by counting the period in which the enable signal ENQ1 is set at the H level (active) based on the reference clock signal CLK.

Note that the enable signal generation circuit 120 may be formed using a flip-flop circuit, the drive clock signal DRCK being input to a clock terminal of the flip-flop circuit, a data terminal of the flip-flop circuit being connected to the power supply GND (low-potential-side power supply), and the waveform-adjusted signal WFQ1 being input to a set terminal of the flip-flop circuit. In this case, a signal obtained by inverting the output signal from the flip-flop circuit may be input to the counter 122 as the enable signal ENQ1.

A count value holding circuit 124 holds a count value CNT1 (pulse width information) from the counter 122. The count value holding circuit 124 outputs data LTQ1 relating to the held count value to an output circuit 126.

The output circuit 126 (filter circuit or noise removal circuit) receives the data LTQ1 relating to the count value held by the count value holding circuit 124, and outputs the data PWQ1 (first pulse width information). The output circuit 126 may include a comparison circuit 130 that compares the count value currently held by the count value holding circuit 124 with the count value previously held by the count value holding circuit 124, and outputs the count value larger than the other, for example. This allows the maximum count value to be held by and output from the output circuit 126. This suppresses a change in pulse width period due to noise or the like, whereby the pulse width can be stably detected. Moreover, the pulse width detection method can be easily combined with the amplitude detection method.

Figure 11:
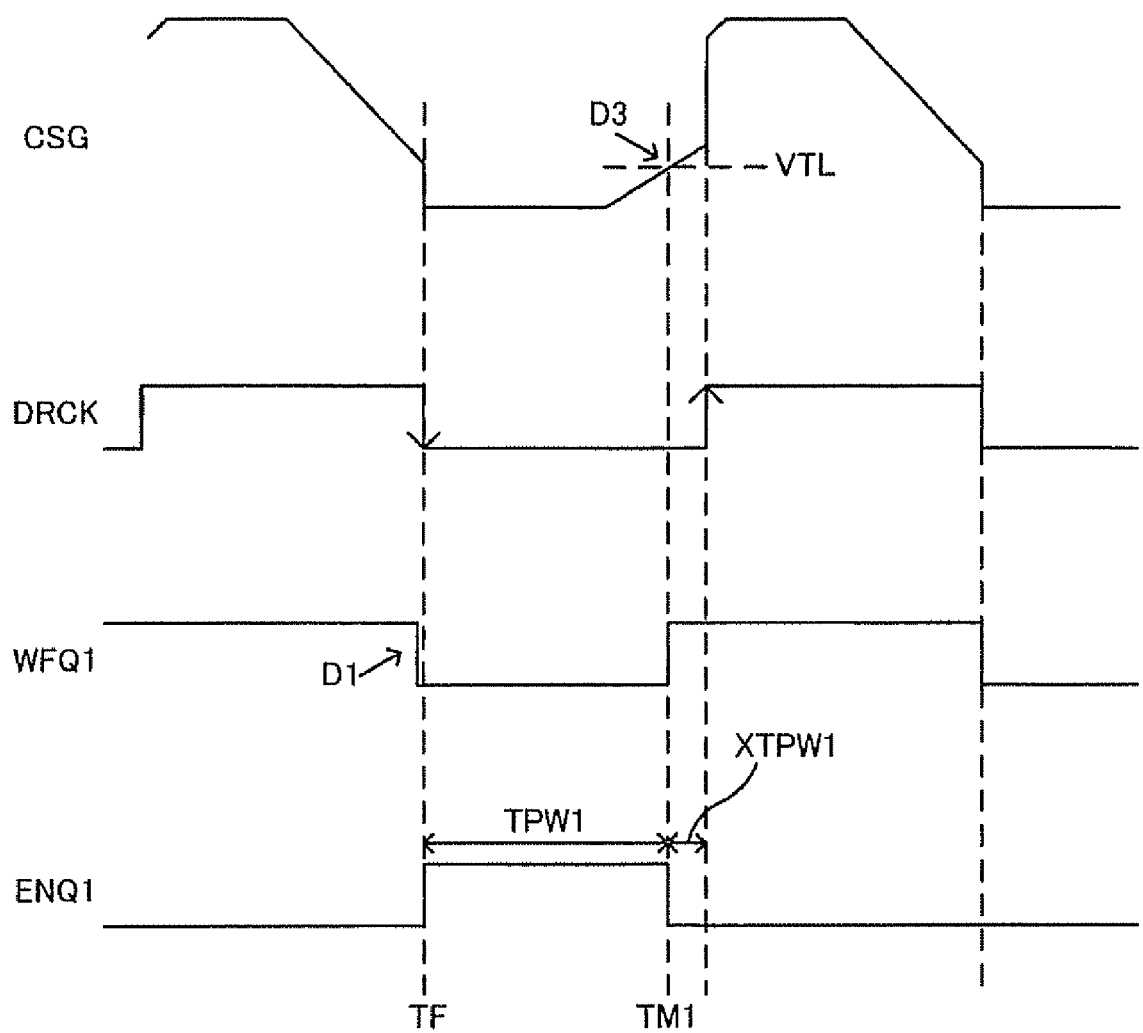
FIG. 11 shows a signal waveform example illustrative of the operation according to the first modification.

FIG. 11 shows a signal waveform example illustrative of the operation of the circuit shown in FIG. 10. When the waveform-adjusted signal WFQ1 is set at the L level at a timing indicated by D1 in FIG. 11, the reset state of the flip-flop circuit FFC1 is canceled. The voltage VDD is input to the flip-flop circuit FFC1 at the falling edge timing TF of the drive clock signal DRCK, whereby the enable signal ENQ1 changes from the L level to the H level. This causes the counter 122 to start the count process and measure the pulse width period TPW1 using the reference clock signal CLK.

When the waveform-adjusted signal WFQ1 is set at the H level at the first timing TM1, the flip-flop circuit FFC1 is reset so that the enable signal ENQ1 changes from the H level to the L level. This causes the counter 122 to stop the count process. The count value obtained by the count process is the measurement result that indicates the pulse width period TPW1.

As shown in FIG. 11, the sum of the pulse width periods TPW1 and XTPW1 corresponds to the half-cycle period of the drive clock signal DRCK. The pulse width period XTPW1 shown in FIGS. 8A to 8C increases as the power-reception-side load increases. Therefore, the pulse width period TPW1 shown in FIG. 11 decreases as the power-reception-side load increases. In the pulse width period XTPW1 shown in FIGS. 8A to 8C, it is difficult to distinguish a noise signal from a pulse signal when the power-reception-side load is low. Such a problem can be prevented using the pulse width period TPW1 shown in FIG. 11.

In the first pulse width detection method according to this embodiment, the pulse width period TPW1 is specified based on the timing TM1 at which the coil end signal CSG that has changed from 0 V exceeds a low-potential-side threshold voltage VTL, as indicated by D3 in FIG. 11. Specifically, the pulse width period TPW1 is the period between the falling edge timing TF of the drive clock signal CLK and the timing TM1. The pulse width period TPW1 changes when the timing TM1 has changed due to a change in power-reception-side change in load. Since the threshold voltage VTL that determines the timing TM1 is low, the timing TM1 varies to only a small extent even if the power supply voltage or the like has changed. The timing TM1 varies to only a small extent even if the distance or the positional relationship between the coils L1 and L2 has changed. Therefore, the first method according to this embodiment implements a pulse width detection method that reduces an adverse effect of a change in power supply voltage or the like.

The rectifier circuit 17 shown in FIG. 10 outputs the coil end signal CSG to the waveform adjusting circuit 32 as the induced voltage signal PHIN1 without dividing the voltage of the coil end signal CSG, differing from a rectifier circuit 18 (see FIG. 16) described later utilizing the second method according to this embodiment. Therefore, the threshold voltage VTL shown in FIG. 11 is almost equal to the threshold voltage of the N-type transistor TC1 of the waveform adjusting circuit 32 shown in FIG. 10, and is almost equal to the threshold voltage VT1 shown in FIGS. 8A to 8C.

Note that the configuration of the waveform adjusting circuit 32 is not limited to the configuration shown in FIG. 10. For example, the waveform adjusting circuit 32 may be formed using a comparator or the like. The configuration of the enable signal generation circuit 120 is not limited to the configuration shown in FIG. 10. For example, the enable signal generation circuit 120 may be formed using a logic circuit such as a NOR circuit or a NAND circuit. The configuration of the output circuit 126 is not limited to the configuration shown in FIG. 10. For example, the output circuit 126 may be formed using an averaging circuit that calculates the average value (moving average) of a plurality of count values (e.g., the current count value and the preceding count value).

5. Second Modification

Figure 12:
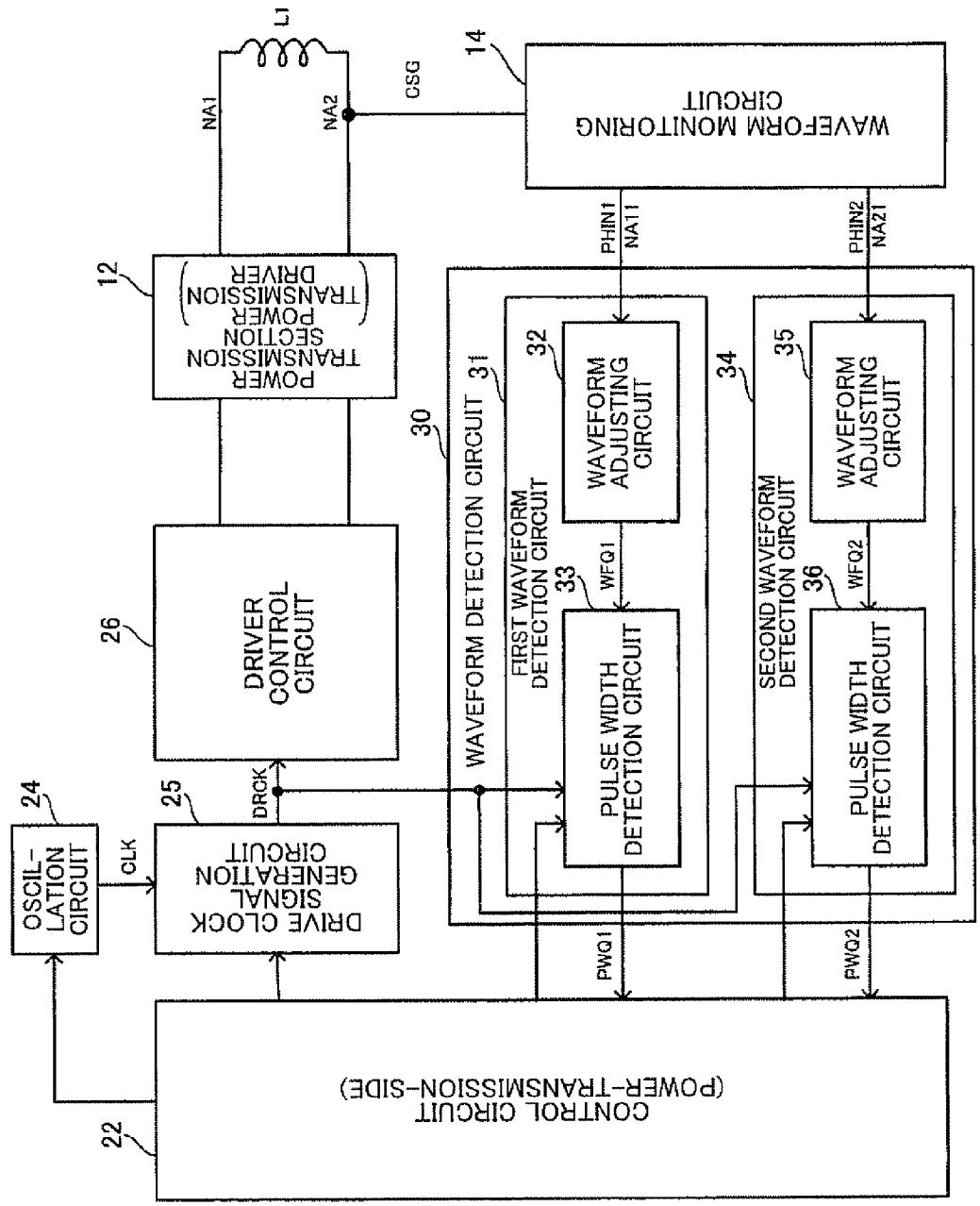
FIG. 12 shows a configuration example according to a second modification of one embodiment of the invention.

FIG. 12 shows a second modification of this embodiment. In the second modification, the waveform detection circuit 30 includes a second waveform detection circuit 34 that detects a change in waveform of a second induced voltage signal PHIN2 of the primary coil L1 in addition to the first waveform detection circuit 31 described with reference to FIGS. 7 and 10. The first waveform detection circuit 31 detects the pulse width using the first pulse width detection method described with reference to FIGS. 8A to 8C and the like. On the other hand, the second waveform detection circuit 34 detects the pulse width using the second pulse width detection method described later with reference to FIGS. 13A to 13C.

The second waveform detection circuit 34 includes a second waveform adjusting circuit 35 and a second pulse width detection circuit 36. The waveform adjusting circuit 35 adjusts the waveform of the induced voltage signal PHIN2 of the primary coil L1, and outputs a waveform-adjusted signal WFQ2. Specifically, the waveform adjusting circuit 35 outputs a square wave (rectangular wave) waveform-adjusted signal WFQ2 that becomes active (e.g., H level) when the signal PHIN2 has exceeded a given threshold voltage, for example.

The pulse width detection circuit 36 detects pulse width information relating to the induced voltage signal PHIN2 of the primary coil L1. Specifically, the pulse width detection circuit 36 receives the waveform-adjusted signal WFQ2 from the waveform adjusting circuit 35 and the drive clock signal DRCK from the drive clock signal generation circuit 25, and detects the pulse width information relating to the waveform-adjusted signal WFQ2 to detect the pulse width information relating to the induced voltage signal PHIN2.

For example, a timing at which the induced voltage signal PHIN2 that has changed from the high-potential-side power supply voltage (VDD) has become lower than a second threshold voltage VT2 is referred to as a second timing. In this case, the pulse width detection circuit 36 measures a second pulse width period that is a period between a second edge timing (e.g., rising edge timing) of the drive clock signal DRCK and the second timing to detect second pulse width information. For example, the pulse width detection circuit 36 measures the second pulse width period in which the voltage signal PHIN2 induced by a change in voltage of the drive clock signal DRCK becomes equal to or higher than the given threshold voltage VT2. The pulse width detection circuit 36 measures the pulse width of the waveform-adjusted signal WFQ2 (induced voltage signal) with respect to the pulse width of the drive clock signal DRCK. In this case, the pulse width detection circuit 36 measures the pulse width period using the reference clock signal CLK, for example. A latch circuit (not shown) latches measurement result data PWQ2 obtained by the pulse width detection circuit 36, for example. Specifically, the pulse width detection circuit 36 measures the pulse width period using a counter that increments (or decrements) the count value based on the reference clock signal CLK, and the latch circuit latches the measurement result data PWQ2.

The control circuit 22 performs foreign object detection (secondary foreign object detection) based on the pulse width information detected by the pulse width detection circuit 36. Alternatively, the control circuit 22 detects data transmitted from the power reception device 40 by means of load modulation.

FIGS. 13A to 13C show measurement results for the signal waveforms of the drive clock signal DRCK, the coil end signal CSG, the induced voltage signal PHIN2, and a pulse signal PLS2. FIGS. 13A, 13B, and 13C show signal waveforms in a low-load state, a medium-load state, and a high-load state, respectively. The pulse signal PLS2 used for pulse width detection is a signal that is set at the H level at a second timing TM1 at which the induced voltage signal PHIN2 exceeds the second threshold voltage VT2 and is set at the L level at a falling edge timing TF of the drive clock signal DRCK. As the threshold voltage VT2 (e.g., a threshold voltage of an N-type transistor) used to measure the pulse width period, a voltage at which the load state detection accuracy is optimized may be appropriately selected.

As shown in FIGS. 13A to 13C, the pulse width period XTPW2 of the pulse signal PLS2 increases as the power-reception-side load increases. Therefore, the power-reception-side load state can be detected by measuring the pulse width period XTPW2. Specifically, a foreign object can be detected (secondary foreign object detection), or whether data (save frame) transmitted from the power-reception-side instrument is "0" or "1" can be detected.

In FIGS. 13A to 13C, the period from the timing TM2 to the falling edge timing TF of the drive clock signal DRCK is defined as the pulse width period XTPW2. In this case, the second waveform detection circuit 34 detects the pulse width period XTPW2 of the pulse signal PLS2 as the second pulse width information. Note that it is desirable that the period from a rising edge timing TR of the drive clock signal DRCK to the timing TM2 be specified as the pulse width period TPW2 (see FIG. 17), and the second waveform detection circuit 33 detect the pulse width period TPW2 as the second pulse width information. This prevents a situation in which the pulse width period is measured while regarding a noise signal as a pulse signal when the power-reception-side load is low. In this case, the pulse width period TPW2 decreases as the power-reception-side load increases.

The second method (falling edge detection system) shown in FIGS. 13A to 13C has an advantage over the first method (rising edge detection method) shown in FIGS. 8A to 8C in that the pulse width (count value) changes to a large extent even if a change in load is small so that high sensitivity is achieved. On the other hand, the first method shown in FIGS. 8A to 8C has an advantage over the second method shown in FIGS. 13A to 13C in that a variation in pulse width detection is small with respect to a change in power supply voltage or a change in distance or positional relationship between the coils L1 and L2.

Figure 14A:
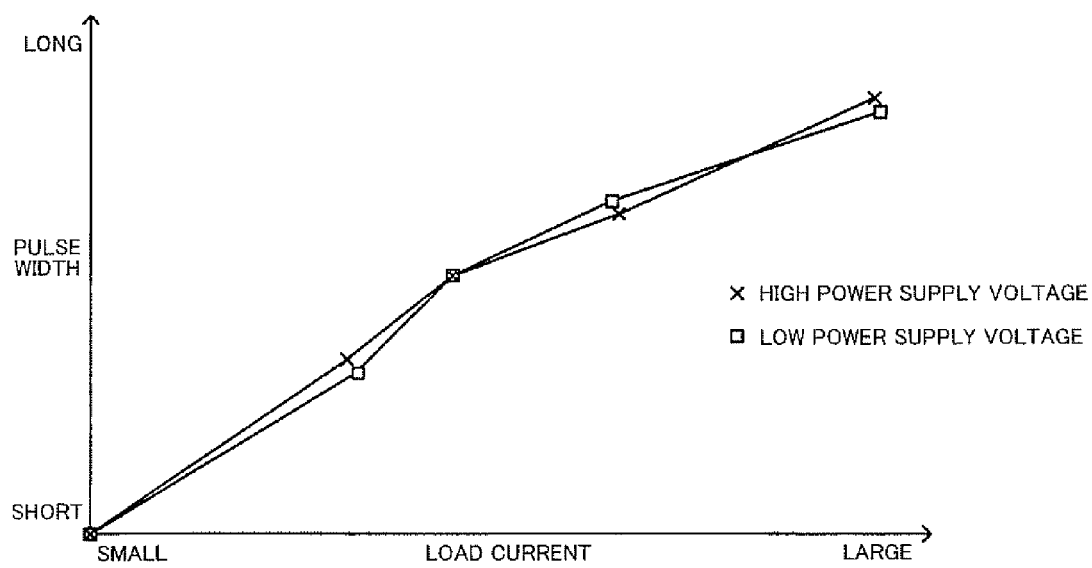
FIGS. 14A and 14B are views illustrative a variation in pulse width detection due to a change in power supply voltage.
Figure 14B:
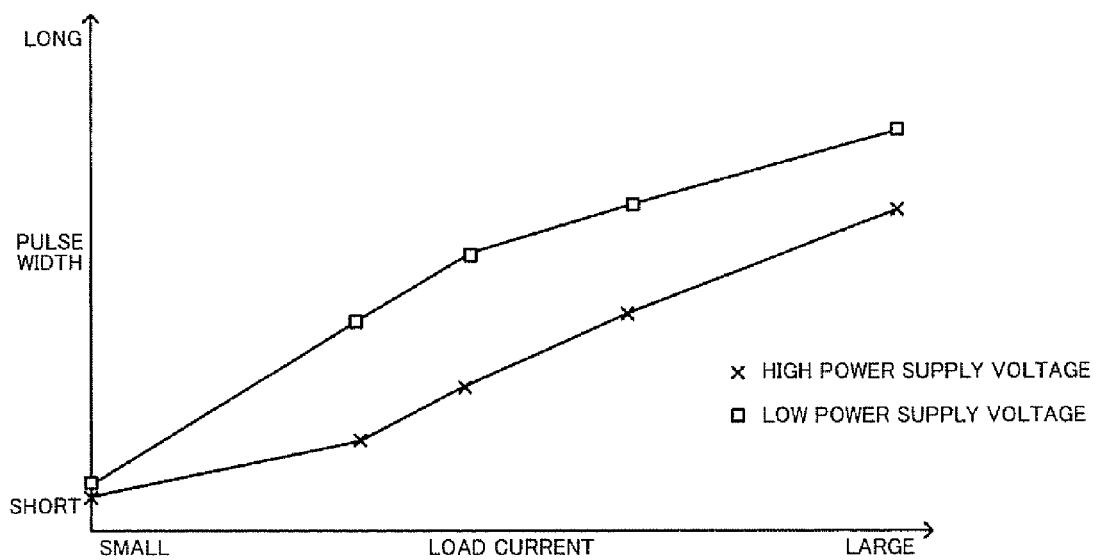

FIG. 14A is a view showing a variation in pulse width detection with respect to a change in power supply voltage when using the first method, and FIG. 14B is a view showing a variation in pulse width detection with respect to a change in power supply voltage when using the second method.

As shown in FIG. 14A, the load current-pulse width characteristic curve does not change to a large extent when using the first method even if the power supply voltage has increased or decreased. As shown in FIG. 14B, when using the second method, the load current-pulse width characteristic curve chances when the power supply voltage has increased or decreased (i.e., a variation in pulse width detection with respect to a change in power supply voltage is large).

In the second modification shown in FIG. 12 the first waveform detection circuit 31 detects the waveform using the first method and the resulting first pulse width information (PWQ1) is used during primary foreign object detection (i.e., foreign object detection before normal power transmission starts). The second waveform detection circuit 34 detects the waveform using the second method and the resulting second pulse width information (PWQ2) is used during secondary foreign object detection (i.e., foreign object detection after normal power transmission has started). Data (data that indicates full-charge detection or the like) transmitted from the power-reception-side instrument is also detected using the second pulse width information, for example.

Figure 15:
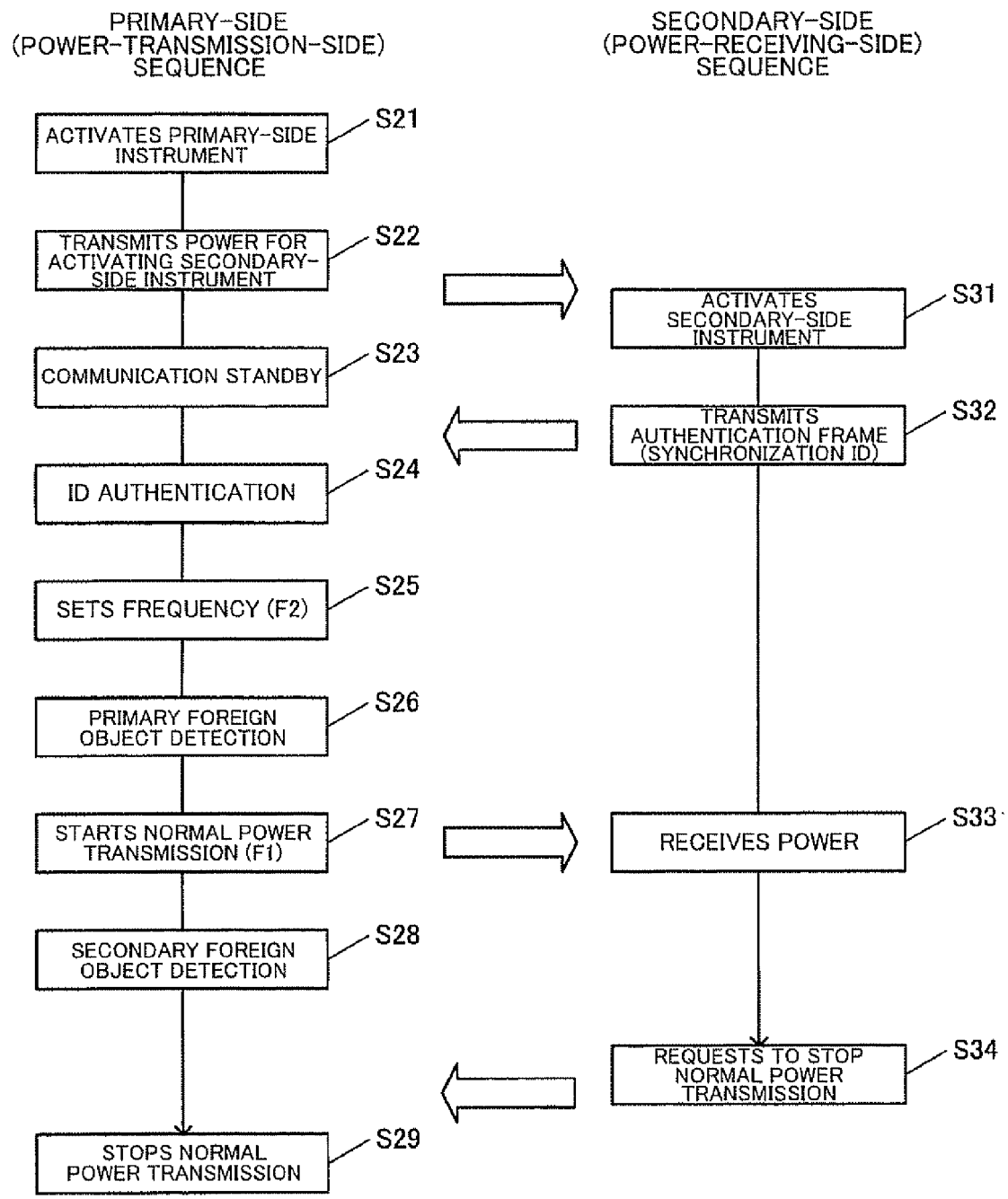
FIG. 15 is a flowchart illustrative of primary foreign object detection and secondary foreign object detection.

FIG. 15 is a flowchart illustrative of primary foreign object detection and secondary foreign object detection.

The primary-side instrument (power transmission device) is activated (step S21). The activated primary-side instrument transmits power (power for position detection) for activating the secondary-side instrument (step S22), and transitions to a communication standby state (step S23). The secondary-side instrument (power reception device) is then activated (step S31), and transmits an authentication frame (synchronization ID) to the primary-side instrument by means of load modulation described with reference to FIG. 3B (step S32).

When the primary-side instrument has received the authentication frame, the primary-side instrument performs ID authentication (step S24). The primary-side instrument then sets the drive frequency (frequency of the drive clock signal DRCK) at the foreign object detection frequency F2 differing from the normal power transmission frequency F1. Specifically, the primary-side instrument then sets the drive frequency at the foreign object detection frequency F2 that is a frequency between the normal power transmission frequency F1 and the coil resonance frequency F0.

The primary-side instrument performs primary foreign object detection in a state in which the drive frequency is set at the foreign object detection frequency F2 (step S26). Specifically, the primary-side instrument performs primary foreign object detection by causing the first waveform detection circuit 31 to detect the waveform using the first method described with reference to FIGS. 8A to 8C.

The primary-side instrument then sets the drive frequency at the normal power transmission frequency F1, and starts normal power transmission (step S27). The secondary-side instrument receives power transmitted from the primary-side instrument (step S33).

After normal power transmission has stared, the secondary-side instrument performs secondary foreign object detection (step S28). Specifically, the secondary-side instrument performs secondary foreign object detection by causing the second waveform detection circuit 34 to detect the waveform using the second method described with reference to FIGS. 13A to 13C. In this case, it is desirable that the secondary-side instrument regularly perform secondary foreign object detection after the normal power transmission has started.

When the secondary-side instrument has detected that the load has been fully charged, the secondary-side instrument requests the primary-side instrument to stop normal power transmission (step S34). The primary-side instrument then stops normal power transmission (step S29).

In FIG. 15, primary foreign object detection is performed in a no-load state before normal power transmission starts, for example. Primary foreign object detection is performed using the first method that reduces a variation with respect to a change in power supply voltage or the like (see FIG. 14A). Therefore, a foreign object can be stably detected even if a change in power supply voltage or the like has occurred. Moreover, the pulse width count value obtained by primary foreign object detection can be set as a reference value. Secondary foreign object detection after normal power transmission can be performed, or whether data transmitted from the power-reception-side instrument is "0" or "1" can be detected, based on the reference value in a no-load state, whereby a change in load can be efficiently detected.

Figure 16:
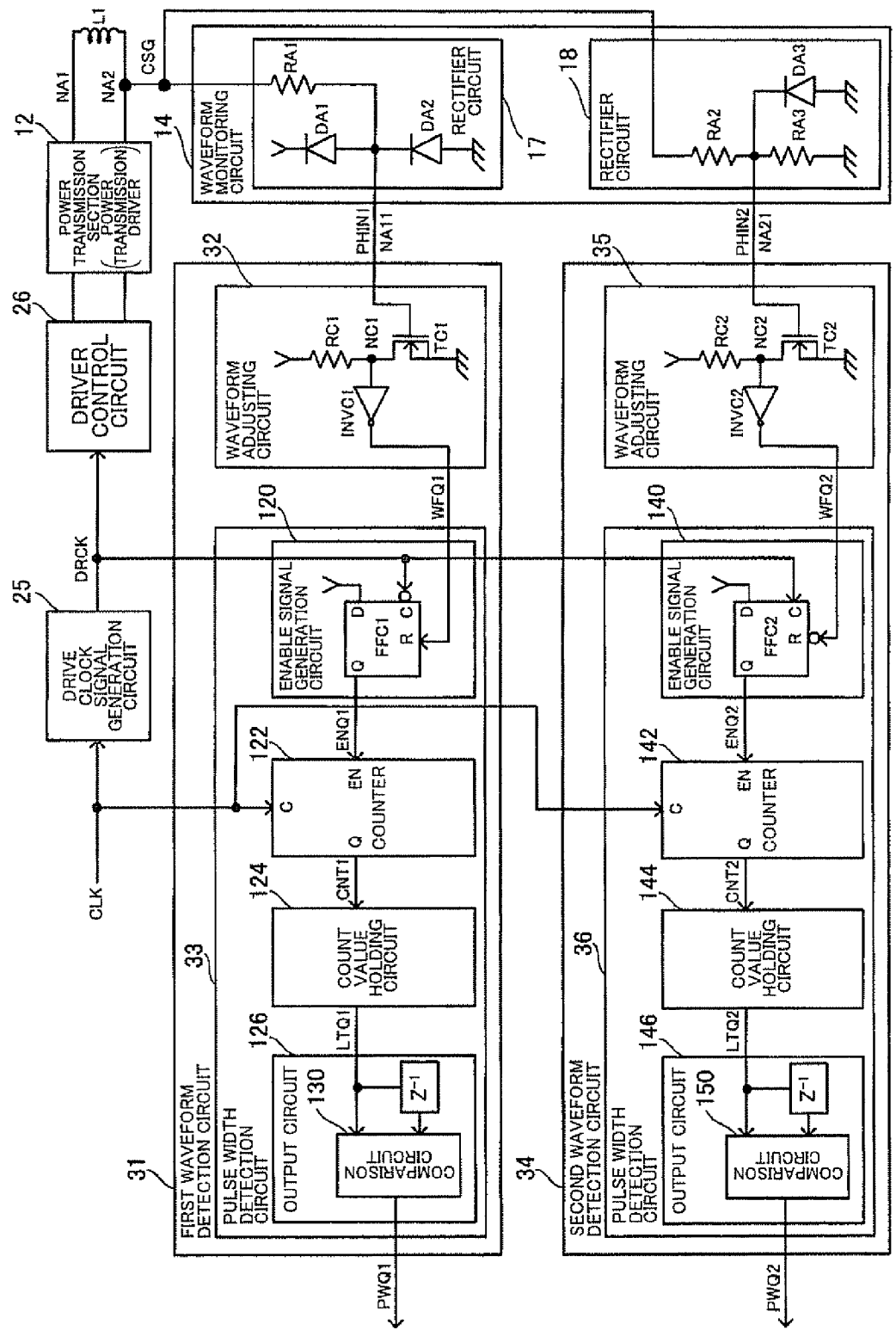
FIG. 16 shows a specific configuration example of the second modification.

FIG. 16 shows a specific configuration example of the second modification of this embodiment. In FIG. 16, the waveform adjusting circuit 35 of the second waveform detection circuit 34 has a configuration similar to that of the waveform adjusting circuit 32 of the first waveform detection circuit 31. An enable signal generation circuit 140 of the second waveform detection circuit 34 is configured so that the drive clock signal DRCK is input to a non-inverting clock terminal of a flip-flop circuit FFC2, and the waveform-adjusted signal WFQ2 is input to an inverting reset terminal of the flip-flop circuit FFC2. The configurations of a counter 142, a count value holding circuit 144, and an output circuit 146 of the second waveform detection circuit 34 are the same as the configurations of the counter 122, the count value holding circuit 124, and the output circuit 126 of the first waveform detection circuit 31.

In FIG. 16, the waveform monitoring circuit 14 includes a second rectifier circuit 18 in addition to the first rectifier circuit 17. The second rectifier circuit 18 outputs the waveform-monitoring second induced voltage signal PHIN2 to the second waveform detection circuit 34 through a second monitor node NA21. Specifically, the rectifier circuit 18 includes a first resistor RA2 provided between the coil end node NA2 and the monitor node NA21, and a second resistor RA3 provided between the monitor node NA21 and a GND (low-potential-side power supply) node. The rectifier circuit 18 also includes a third diode DA3 provided between the monitor node NA21 and the GND node. The voltage of the coil end signal CSG is divided by the resistors RA2 and RA3, and the resulting signal is input to the second waveform detection circuit 34 as the induced voltage signal PHIN2. The diode DA3 subjects the coil end signal CSG to half-wave rectification so that a negative voltage is not applied to the second waveform detection circuit 34.

Figure 17:
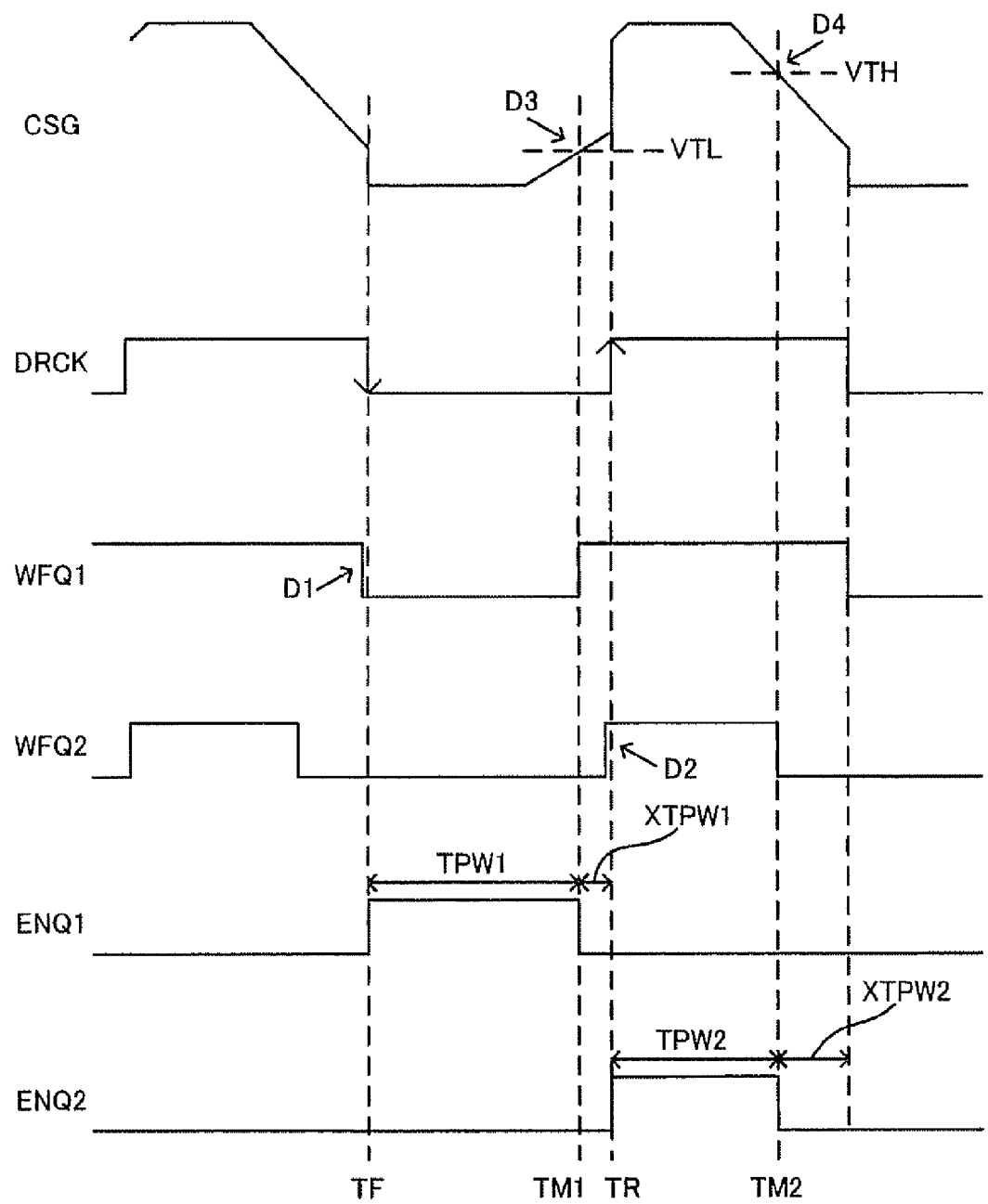
FIG. 17 shows a signal waveform example illustrative of the operation according to the second modification.

FIG. 17 shows a signal waveform example illustrative of the operation of the circuit shown in FIG. 16. When the waveform-adjusted signal WFQ2 is set at the H level at a timing indicated by D2 in FIG. 17, the reset state of the flip-flop circuit FFC2 is canceled. The voltage VDD is input to the flip-flop circuit FFC2 at the rising edge timing TR of the drive clock signal DRCK, whereby the enable signal ENQ2 changes from the L level to the H level. This causes the counter 142 to start the count process and measure the pulse width period TPW2 using the reference clock signal CLK.

When the waveform-adjusted signal WFQ2 is set at the L level at the second timing TM2, the flip-flop circuit FFC2 is reset so that the enable signal ENQ2 changes from the H level to the L level. This causes the counter 142 to stop the count process. The count value obtained by the count process is the measurement result that indicates the pulse width period TPW2.

As shown in FIG. 17, the sum of the pulse width periods TPW2 and XTPW2 corresponds to the half-cycle period of the drive clock signal DRCK. The pulse width period XTPW2 shown in FIGS. 13A to 13C increases as the power-reception-side load increases. Therefore, the pulse width period TPW2 shown in FIG. 17 decreases as the power-reception-side load increases. In the pulse width period XTPW2 shown in FIGS. 13A to 13C, it is difficult to distinguish a noise signal from a pulse signal when the power-reception-side load is low. Such a problem can be prevented using the pulse width period TPW2 shown in FIG. 17.

The timing TM1 is determined using a low-potential-side threshold voltage VTL (see D3 in FIG. 17) when using the first method, and the timing TM2 is determined using a high-potential-side threshold voltage VTH (see D4 in FIG. 17) when using the second method.

When the rectifier circuit 18 for the second method (see FIG. 16) is used when using the first method that determines the timing TM1 using the low-potential-side threshold voltage VTL (see D3 in FIG. 17), the waveform may be deformed due to voltage division using the resistors RA2 and RA3, whereby the detection accuracy may deteriorate.

The rectifier circuit 17 used for the first method shown in FIG. 16 can input the signal PHIN1 obtained by subjecting the coil end signal CSG to the clamp operation and half-wave rectification to the first waveform monitoring circuit 31 without performing voltage division using a resistor. Therefore, the pulse width can be detected based on the signal PHIN1 that has a fine waveform (i.e., is not subjected to voltage division using a resistor). As a result, the detection accuracy can be improved. Moreover, a situation in which the signal PHIN1 exceeds the maximum rated voltage or a negative voltage is input to the first waveform detection circuit 31 can be prevented by providing the diodes DA1 and DA2.

On the other hand, the rectifier circuit 18 used for the second method outputs the signal PHIN2 of which the voltage has been divided by the resistors RA2 and RA3 to an N-type transistor TC2 of the waveform adjusting circuit 35. A situation in which the signal PHIN2 exceeds the maximum rated voltage can be prevented by dividing the voltage of the signal PHIN2. Moreover, the high-potential-side threshold voltage VTH can be set, as indicated by D4 in FIG. 17. Specifically, the signals PHIN1 and PHIN2 are respectively input to the gates of the N-type transistors TC1 and TC2 having the same threshold voltage. However, since the signal PHIN2 is obtained by voltage division using the resistors RA2 and RA3, the threshold voltage VTH indicated by D4 is higher than the threshold voltage VTL indicated by D3 with respect to the coil end signal CSG. A change in pulse width with respect to a change in load increases by setting the threshold voltage VTH at such a high voltage, whereby a change in load can be detected with high sensitivity. Therefore, secondary foreign object detection after normal power transmission has started or determination of whether data transmitted from the secondary-side instrument is "1" or "0" can be appropriately performed.

6. Third Modification

Figure 18:
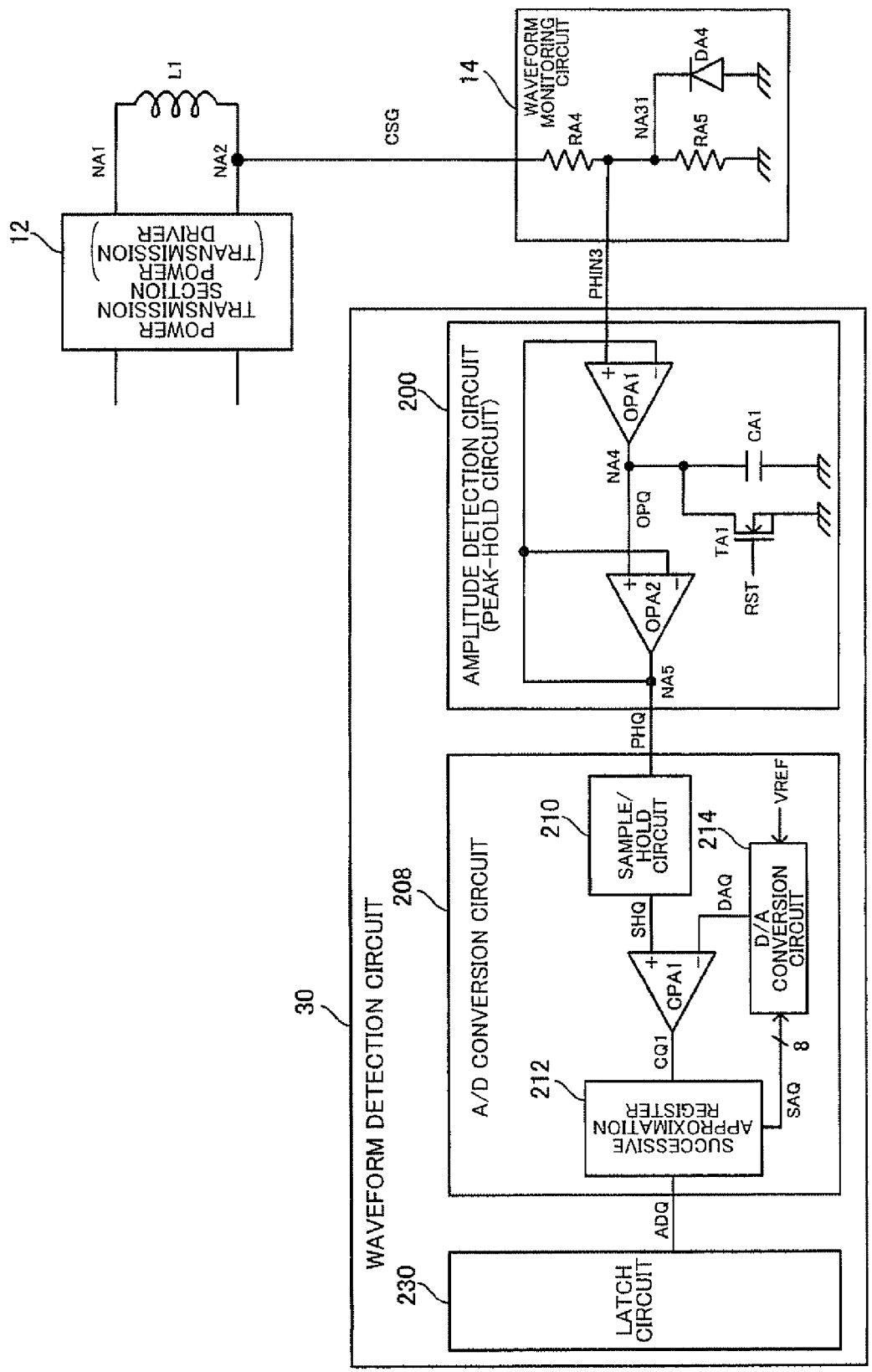
FIG. 18 shows a configuration example of a third modification according to one embodiment of the invention.

FIG. 18 shows a third modification of this embodiment. In the third modification, the waveform detection circuit 30 includes an amplitude detection circuit 200, an A/D conversion circuit 208, and a latch circuit 230. The waveform detection circuit 30 detects a change in power-reception-side load by detecting amplitude information (peak voltage, amplitude voltage, or alternating-current voltage) relating to an induced voltage signal PHIN3. The drive frequency may be set at the foreign object detection frequency F2 during foreign object detection utilizing such amplitude detection. A third waveform detection circuit that includes the amplitude detection circuit 200, the A/D conversion circuit 208, and the latch circuit 230 shown in FIG. 18 may be provided in addition to the first waveform detection circuit 31 and the second waveform detection circuit 34 shown in FIG. 12.

The amplitude detection circuit 200 includes operational amplifiers OPA1 and OPA2, a hold capacitor CA1, and a reset N-type transistor TA1. A signal PHIN3 is input to a non-inverting input terminal of the operational amplifier OPA1, and an output node NA5 of the operational amplifier OPA2 is connected to an inverting input terminal of the operational amplifier OPA1. The hold capacitor CA1 and the reset transistor TAI are provided between a peak voltage hold node NA4 (i.e., output node of the operational amplifier OPA1) and the power supply GND. The hold node NA4 is connected to a non-inverting input terminal of the operational amplifier OPA2, and the output node NA5 of the operational amplifier OPA2 is connected to an inverting input terminal of the operational amplifier OPA2 so that the operational amplifier OPA2 forms a voltage-follower-connected operational amplifier. A voltage-follower-connected operational amplifier may be further provided in the subsequent stage of the operational amplifier OPA2.

The operational amplifiers OPA1 and OPA2, the hold capacitor CA1, and the reset transistor TA1 shown in FIG. 18 form a peak-hold circuit (peak detection circuit). Specifically, the peak voltage of the signal PHIN2 from the waveform monitoring circuit 14 is held by the hold node NA4, and the peak voltage signal held by the hold node NA4 is subjected to impedance conversion by the voltage-follower-connected operational amplifier OPA2 and is output to the node NA5. The reset transistor TAI is turned ON in a reset period to discharge the hold node NA4 toward the power supply GND.

The A/D conversion circuit 208 includes a sample/hold circuit 210, a comparator CPA1, a successive approximation register 212, and a D/A conversion circuit 214. The sample/hold circuit 210 samples and holds the signal PHQ. The comparator CPA1 compares a D/A-converted analog signal DAQ from the D/A conversion circuit 214 with a sample/hold signal SHQ from the sample/hold circuit 210. The successive approximation register 212 (successive approximation type control circuit) stores data relating to an output signal CQ1 from the comparator CPA1. The P/A conversion circuit 214 subjects digital data SAQ (e.g., eight bits) from the successive approximation register 212 to D/A conversion, and outputs the analog signal DAQ.

In the successive approximation A/D conversion circuit 208, the comparator CPA 1 compares the D/A-converted signal DAQ when only the most significant bit (MSB) is set at "1" with the input signal SHQ (PHQ). When the voltage of the signal SHQ is higher than the voltage of the signal DAQ, the comparator CPA1 maintains the MSB at "1". When the voltage of the signal SHQ is lower than the voltage of the signal DAQ, the comparator CPA1 sets the MSB at "0". The A/D conversion circuit 208 performs the successive approximation process on the lower-order bits in the same manner as described above. The A/D conversion circuit 208 outputs the resulting digital data ADQ to the latch circuit 30. Note that the A/D conversion circuit 208 is not limited to the configuration shown in FIG. 18. For example, the A/D conversion circuit 208 may be a successive approximation type A/D conversion circuit having a different circuit configuration, or may be a servo-balancing type, parallel comparison type, or dual-slope type A/D conversion circuit.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., GND, VDD, and portable telephone/charger) cited with a different term (e.g., low-potential-side power supply, high-potential-side power supply, and electronic instrument) having a broader meaning or the same meaning at least once in the specification and the drawings can be replaced by the different term in any place in the specification and the drawings. The invention also includes any combinations of the embodiments and the modifications. The configurations and the operations of the power transmission control device, the power transmission device, the power reception control device, and the power reception device, the foreign object detection method, and the pulse width detection method are not limited to those described relating to the above embodiments. Various modifications and variations may be made.

What is claimed is:

1. A power transmission control device provided in a power transmission device included in a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates and outputs a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

2. The power transmission control device as defined in claim 1,
the drive clock signal generation circuit outputting the drive clock signal set at the foreign object detection frequency during foreign object detection, the foreign object detection frequency being a frequency between the normal power transmission frequency and a coil resonance frequency.

3. The power transmission control device as defined in claim 1,
the waveform detection circuit including a pulse width detection circuit that detects pulse width information relating to the induced voltage signal; and
the control circuit performing foreign object detection based on the pulse width information.

4. The power transmission control device as defined in claim 1,
the waveform detection circuit including a first pulse width detection circuit that measures a first pulse width period to detect first pulse width information, the first pulse width period being a period between a first edge timing of the drive clock signal and a first timing, the first timing being a timing when a first induced voltage signal of the primary coil that has changed from a low-potential-side power supply voltage exceeds a first threshold voltage; and
the control circuit performing foreign object detection based on the first pulse width information.

5. The power transmission control device as defined in claim 4,
the waveform detection circuit including a first waveform adjusting circuit that adjusts a waveform of the first induced voltage signal and outputs a first waveform-adjusted signal; and
the first pulse width detection circuit measuring the first pulse width period based on the first waveform-adjusted signal and the drive clock signal.

6. The power transmission control device as defined in claim 5,
the first pulse width detection circuit including a first counter that increments or decrements a count value in the first pulse width period and measures the first pulse width period based on the resulting count value.

7. The power transmission control device as defined in claim 6,
the first pulse width detection circuit including a first enable signal generation circuit that receives the first waveform-adjusted signal and the drive clock signal and generates a first enable signal that becomes active in the first pulse width period; and
the first counter incrementing or decrementing the count value when the first enable signal is active.

8. The power transmission control device as defined in claim 7,
the first enable signal generation circuit including a first flip-flop circuit, the drive clock signal being input to a clock terminal of the first flip-flop circuit, a high-potential-side power supply voltage or a low-potential-side power supply voltage being input to a data terminal of the first flip-flop circuit, and the first waveform-adjusted signal being input to a reset terminal or a set terminal of the first flip-flop circuit.

9. The power transmission control device as defined in claim 4,
the control circuit performing primary foreign object detection based on the first pulse width information, the primary foreign object detection being foreign object detection before normal power transmission starts.

10. The power transmission control device as defined in claim 9,
the waveform detection circuit including a second pulse width detection circuit that measures a second pulse width period to detect second pulse width information, the second pulse width period being a period between a second edge timing of the drive clock signal and a second timing, the second timing being a timing when a second induced voltage signal of the primary coil that has changed from a high-potential-side power supply voltage exceeds a second threshold voltage; and
the control circuit performing secondary foreign object detection based on the second pulse width information, the secondary foreign object detection being foreign object detection after normal power transmission has started.

11. The power transmission control device as defined in claim 10,
the waveform detection circuit including a second waveform adjusting circuit that adjusts a waveform of the second induced voltage signal and outputs a second waveform-adjusted signal; and
the second pulse width detection circuit measuring the second pulse width period based on the second waveform-adjusted signal and the drive clock signal.

12. The power transmission control device as defined in claim 11,
the second pulse width detection circuit including a second counter that increments or decrements a count value in the second pulse width period and measures the second pulse width period based on the resulting count value.

13. The power transmission control device as defined in claim 11,
the waveform detection circuit including a first waveform adjusting circuit that adjusts a waveform of the first induced voltage signal and outputs a first waveform-adjusted signal to the first pulse width detection circuit; and
the second waveform adjusting circuit adjusting a waveform of the second induced voltage signal differing from the first induced voltage signal, and outputting the second waveform-adjusted signal to the second pulse width detection circuit.

14. A power transmission device comprising:
the power transmission control device as defined in claim 1; and
a power transmission section that generates an alternating-current voltage and supplies the alternating-current voltage to the primary coil.

15. An electronic instrument comprising the power transmission device as defined in claim 14.

16. A non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device,
the power reception device including a power reception section that converts an induced voltage in the secondary coil into a direct-current voltage; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform detection circuit that detects a change in waveform of an induced voltage signal of the primary coil; and a control circuit that performs foreign object detection based on a detection result of the waveform detection circuit, the drive clock signal generation circuit outputting the drive clock signal set at a foreign object detection frequency during foreign object detection, the foreign object detection frequency being a frequency differing from a normal power transmission frequency.

* * * * *